United States Patent
Mitsumoto et al.

(10) Patent No.: US 12,347,856 B2
(45) Date of Patent: *Jul. 1, 2025

(54) POSITIVE ELECTRODE ACTIVE SUBSTANCE FOR ALL SOLID-STATE LITHIUM SECONDARY BATTERY

(71) Applicant: Mitsui Mining & Smelting Co., Ltd., Tokyo (JP)

(72) Inventors: Tetsuya Mitsumoto, Takehara (JP); Daisuke Washida, Ageo (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 993 days.

This patent is subject to a terminal disclaimer.

(21) Appl. No.: 16/642,614

(22) PCT Filed: Aug. 27, 2018

(86) PCT No.: PCT/JP2018/031484
§ 371 (c)(1),
(2) Date: Feb. 27, 2020

(87) PCT Pub. No.: WO2019/044733
PCT Pub. Date: Mar. 7, 2019

(65) Prior Publication Data
US 2020/0194788 A1     Jun. 18, 2020

(30) Foreign Application Priority Data
Aug. 28, 2017  (JP) ................................. 2017-163710

(51) Int. Cl.
*H01M 4/505*   (2010.01)
*H01M 4/02*    (2006.01)
(Continued)

(52) U.S. Cl.
CPC ........... *H01M 4/505* (2013.01); *H01M 4/131* (2013.01); *H01M 4/36* (2013.01); *H01M 4/366* (2013.01);
(Continued)

(58) Field of Classification Search
None
See application file for complete search history.

(56) References Cited

U.S. PATENT DOCUMENTS

| | | |
|---|---|---|
| 6,337,158 B1 | 1/2002 | Nakajima et al. |
| 8,114,309 B2 | 2/2012 | Kajiya et al. |

(Continued)

FOREIGN PATENT DOCUMENTS

| | | |
|---|---|---|
| CN | 102149641 A | 8/2001 |
| CN | 102856542 A | 1/2013 |

(Continued)

OTHER PUBLICATIONS

Machine translation of JP 2014-009614 A (Year: 2014).*

(Continued)

*Primary Examiner* — Robert S Carrico
(74) *Attorney, Agent, or Firm* — The Webb Law Firm

(57) ABSTRACT

A positive electrode active substance for an all solid-state lithium secondary battery having an operating potential of 4.5 V or more at a metal Li reference potential, wherein the surface of the present core particles composed of a spinel-type lithium manganese-containing composite oxide containing at least Li, Mn, O, and two or more elements other than these is coated with an amorphous compound containing Li, A, where A represents one element or a combination of two or more elements selected from the group consisting of Ti, Zr, Ta, Nb, Zn, W, and Al, and O. Primary particles of the present core particles are composed of a polycrystal. The D50 is 0.5-9 μm, the value of (|mode diameter−D50|/mode (Continued)

diameter)×100 is 0 to 25%, the value of (|mode diameter−D10|/mode diameter)×100 is 20-58%, and the value of the average primary particle diameter/D50 is 0.20-0.99.

20 Claims, 1 Drawing Sheet

(51) Int. Cl.
*H01M 4/131* (2010.01)
*H01M 4/1391* (2010.01)
*H01M 4/36* (2006.01)
*H01M 4/485* (2010.01)
*H01M 4/525* (2010.01)
*H01M 4/62* (2006.01)
*H01M 10/0525* (2010.01)
*H01M 10/0562* (2010.01)

(52) U.S. Cl.
CPC ......... *H01M 4/485* (2013.01); *H01M 4/525* (2013.01); *H01M 4/628* (2013.01); *H01M 10/0525* (2013.01); *H01M 10/0562* (2013.01); *H01M 2004/021* (2013.01); *H01M 2004/028* (2013.01); *H01M 4/1391* (2013.01)

(56) References Cited

U.S. PATENT DOCUMENTS

| | | | |
|---|---|---|---|
| 8,852,811 | B2 | 10/2014 | Koga et al. |
| 9,240,595 | B2 | 1/2016 | Kagei et al. |
| 9,478,808 | B2 | 10/2016 | Takei et al. |
| 9,537,140 | B2 | 1/2017 | Shibamura et al. |
| 2005/0271943 | A1* | 12/2005 | Park .................. C01G 53/54 429/223 |
| 2009/0081554 | A1* | 3/2009 | Takada ............... H01M 10/052 427/126.3 |
| 2009/0289218 | A1 | 11/2009 | Kajiya et al. |
| 2010/0173199 | A1 | 7/2010 | Hiraki et al. |
| 2011/0210287 | A1 | 9/2011 | Koga et al. |
| 2012/0028128 | A1 | 2/2012 | Seino et al. |
| 2012/0094185 | A1 | 4/2012 | Tsuchida et al. |
| 2014/0034872 | A1 | 2/2014 | Watanabe et al. |
| 2014/0065298 | A1 | 3/2014 | Yanagisawa et al. |
| 2014/0162119 | A1 | 6/2014 | Takei et al. |
| 2014/0252268 | A1 | 9/2014 | Kagei et al. |
| 2014/0287324 | A1 | 9/2014 | Tsuchida et al. |
| 2015/0104644 | A1 | 4/2015 | Iwata et al. |
| 2015/0132651 | A1 | 5/2015 | Lee et al. |
| 2015/0147652 | A1 | 5/2015 | Shibamura et al. |
| 2015/0221978 | A1 | 8/2015 | Murota et al. |
| 2015/0243984 | A1 | 8/2015 | Kase et al. |
| 2015/0255791 | A1 | 9/2015 | Kagei et al. |
| 2015/0263341 | A1 | 9/2015 | Kato et al. |
| 2015/0270537 | A1 | 9/2015 | Kato et al. |
| 2015/0271943 | A1 | 9/2015 | Peng et al. |
| 2015/0287985 | A1 | 10/2015 | Miki |
| 2016/0093882 | A1 | 3/2016 | Kagei et al. |
| 2016/0111716 | A1 | 4/2016 | Kagei et al. |
| 2016/0156033 | A1 | 6/2016 | Fujii et al. |
| 2016/0211519 | A1 | 7/2016 | Uchiyama et al. |
| 2016/0268595 | A1 | 9/2016 | Miki |
| 2016/0351943 | A1 | 12/2016 | Albano et al. |
| 2016/0372749 | A1 | 12/2016 | Iida et al. |
| 2017/0033354 | A1 | 2/2017 | Ruan et al. |
| 2017/0207456 | A1 | 7/2017 | Liu et al. |
| 2017/0309908 | A1 | 10/2017 | Mitsumoto et al. |
| 2018/0323431 | A1 | 11/2018 | Kase et al. |
| 2019/0051900 | A1 | 2/2019 | Yamaguchi et al. |
| 2019/0058191 | A1* | 2/2019 | Mitsumoto ........... H01M 4/505 |

FOREIGN PATENT DOCUMENTS

| | | |
|---|---|---|
| CN | 103872311 A | 6/2014 |
| CN | 104157902 A | 11/2014 |
| CN | 104661963 A | 5/2015 |
| CN | 105378987 A | 3/2016 |
| CN | 105428631 A | 3/2016 |
| CN | 105493318 A | 4/2016 |
| EP | 2172996 A1 | 4/2010 |
| EP | 2869369 A1 | 5/2015 |
| JP | H8167425 A | 6/1996 |
| JP | H1173962 A | 3/1999 |
| JP | H11307092 A | 11/1999 |
| JP | 2000235857 A | 8/2000 |
| JP | 200152733 A | 2/2001 |
| JP | 2002373643 A | 12/2002 |
| JP | 2003197194 A | 7/2003 |
| JP | 2008147068 A | 6/2008 |
| JP | 2009302067 A | 12/2009 |
| JP | 2010282948 A | 12/2010 |
| JP | 2012216548 A | 11/2012 |
| JP | 2012234648 A | 11/2012 |
| JP | 2014130851 A | 7/2014 |
| JP | 2014139119 A | 7/2014 |
| JP | 2014166951 A | 9/2014 |
| JP | 201565007 A | 4/2015 |
| JP | 5752890 B2 | 5/2015 |
| JP | 2015130273 A | 7/2015 |
| JP | 2015140292 A | 8/2015 |
| JP | 2015140297 A | 8/2015 |
| JP | 2015527714 A | 9/2015 |
| JP | 2015179616 A | 10/2015 |
| JP | 20169614 A | 1/2016 |
| JP | 201639062 A | 3/2016 |
| JP | 2016170973 A | 9/2016 |
| KR | 1020120016079 A | 2/2012 |
| KR | 1020150115673 A | 10/2015 |
| WO | 2007004590 A1 | 1/2007 |
| WO | 2013073214 A1 | 5/2013 |
| WO | 2014104234 A1 | 7/2014 |
| WO | 2014185547 A1 | 11/2014 |
| WO | 2014185548 A1 | 11/2014 |
| WO | 2016175311 A1 | 11/2016 |
| WO | 2017150504 A1 | 9/2017 |

OTHER PUBLICATIONS

Mao et al., "Effect of Chromium and Niobium Doping on the Morphology and Electrochemical Performance of High-Voltage Spinel LiNi0.5Mn1.5O4 Cathode Material", ACS Applied Materials & Interfaces, 2016, pp. 9116-9124, vol. 8, ACS Publications.

"Standard for Nonferrous Metal Industry of People's Republic of China, Lithium Nickel Cobalt Aluminum Oxide", Released by the Ministry of Industry and Information Technology of the People's Republic of China, Released on Jul. 11, 2016, pp. 1-23, YS/T 1125-2016.

* cited by examiner

POSITIVE ELECTRODE ACTIVE SUBSTANCE FOR ALL SOLID-STATE LITHIUM SECONDARY BATTERY

CROSS-REFERENCE TO RELATED APPLICATIONS

This application is the United States national phase of International Application No. PCT/JP2018/031484 filed Aug. 27, 2018, and claims priority to Japanese Patent Application No. 2017-163710 filed Aug. 28, 2017, the disclosures of which are hereby incorporated by reference in their entirety.

BACKGROUND OF THE INVENTION

Field of the Invention

The present invention relates to a positive electrode active substance that can be suitably used for a lithium secondary battery using a solid electrolyte (referred to as "all solid-state lithium secondary battery"). Particularly, the present invention relates to a 5 V-class positive electrode active substance having an operating potential of 4.5 V or more at a metal Li reference potential.

Description of Related Art

Lithium secondary batteries have characteristics of high energy density, long life, and the like. Therefore, the lithium secondary batteries are widely used as power supplies for electric appliances such as video cameras, portable electronic devices such as laptop computers and mobile telephones, and electric tools such as power tools. Recently, the lithium secondary batteries are also applied to large-sized batteries that are mounted in electric vehicles (EVs), hybrid electric vehicles (HEVs), and the like.

The lithium secondary batteries are secondary batteries having a structure in which, at the time of charging, lithium begins to dissolve as ions from the positive electrode and moves to the negative electrode to be stored therein, and at the time of discharging, the lithium ions return from the negative electrode to the positive electrode; and it is known that the higher energy density is attributable to the electric potential of the positive electrode material.

The lithium secondary battery of this kind is generally constituted of a positive electrode, a negative electrode, and an ion conducting layer inserted between both of the electrodes. As the ion conducting layer, a separator constituted of a porous film such as polyethylene or polypropylene, which is filled with a non-aqueous electrolytic solution, is generally used.

However, since such a flammable organic electrolytic solution is used, it is required to improve the structure and material for preventing volatilization and leakage, and also, it is required to install a safety device for suppressing an increase in temperature at the time of a short circuit and to improve the structure and material for preventing a short circuit.

In contrast, an all solid-state lithium secondary battery does not require a flammable organic electrolyte solution. Therefore, simplification of safety devices can be attempted, and the battery can be excellent in terms of production cost and productivity. Also, the battery has a feature that the solid electrolyte can be laminated in series in a cell, to achieve a high voltage battery.

Furthermore, in the solid electrolyte of this kind, since nothing but an ion moves, side reactions caused by movement of anions do not occur, and it is expected that this leads to improvement of safety and durability.

The solid electrolyte to be used in the all solid-state lithium secondary battery is required to have high ionic conductivity as far as possible and to be stable chemically and electrochemically. For example, lithium halide, lithium nitride, lithium acid salt, derivatives of these compounds, and the like are known as candidate materials for the solid electrolyte.

On the other hand, the solid electrolyte and the positive electrode active substance to be used in the all solid-state lithium secondary battery have a problem in that a high resistant layer is formed by reacting each other, and thus the interfacial resistance becomes large. Therefore, proposals for improving the interface have been disclosed.

For example, in regard to a positive electrode active substance that can be used for an all solid-state lithium secondary battery, International Publication No. WO 2007/4590 discloses that a $LiNbO_3$ coating layer is formed on the surface of the positive electrode active substance, and, by using such a positive electrode active substance, the output characteristics of the all solid-battery can be improved by interposing a lithium ion-conducting oxide layer between the interfaces of the positive electrode active substance and a solid electrolyte.

Further, Japanese Patent Laid-Open No. 2015-179616 discloses an active substance powder that has a coating layer containing $LiNbO_3$ on the surface of the active substance particles capable of absorbing and desorbing lithium ions at a potential of 4.5 or more based on Li.

SUMMARY OF THE INVENTION

As disclosed in Japanese Patent Laid-Open No. 2015-179616, it is confirmed that when a lithium ion-conducting oxide layer such as $LiNbO_3$ is formed on the surface of a positive electrode active substance capable of absorbing and desorbing lithium ions at a potential of 4.5 V or more based on Li (referred to as "5 V-class positive electrode active substance"), and interposed between the interfaces of the 5 V-class positive electrode active substance and a solid electrolyte, the battery capacity can be further increased.

However, when investigating a spinel-type composite oxide containing Li, Mn, O, and two or more elements other than these, it is found, in the 5 V-class positive electrode active substance, that the resistance cannot be suppressed while enhancing the ionic conductivity only by forming a lithium ion-conducting oxide layer such as $LiNbO_3$, and thus the rate characteristics and cycle characteristics cannot be improved. It is assumed that this is because the interfacial resistance between the active substance and the solid electrolyte is remarkably increased when using the 5 V-class positive electrode active substance.

Thus, the present invention is to provide a novel positive electrode active substance capable of suppressing the resistance and improving the rate characteristics and cycle characteristics while enhancing the ionic conductivity, in which the surface of particles composed of a spinel-type composite oxide containing Li, Mn, O, and two or more elements other than these is coated with a lithium ion-conducting oxide. Particularly, the present invention focuses on reducing the contact resistance between the positive electrode active substance and the solid electrolyte, and is to provide a positive electrode active substance capable of maintaining a high operating voltage during discharge.

The present invention proposes a positive electrode active substance for an all solid-state lithium secondary battery having an operating potential of 4.5 V or more at a metal Li reference potential, wherein the surface of particles (also referred to as "present core particles") composed of a spinel-type lithium manganese-containing composite oxide containing at least Li, Mn, O, and two or more elements other than these is coated with an amorphous compound containing Li, A (A represents one element or a combination of two or more elements selected from the group consisting of Ti, Zr, Ta, Nb, Zn, W, and Al), and O; and primary particles of the present core particles are composed of a polycrystal;

wherein, with regard to a D50, a mode diameter, and a D10 of the positive electrode active substance according to a measurement of a volume-based particle size distribution obtained via measurements by a laser diffraction scattering-type particle size distribution measurement method (referred to as "D50", "mode diameter", and "D10", respectively), the D50 is 0.5 to 9 μm, a percentage of a ratio of the absolute value of the difference between the mode diameter and the D50 relative to the mode diameter ((|mode diameter−D50|/mode diameter)×100) is 0 to 25%, a percentage of a ratio of the absolute value of the difference between the mode diameter and the D10 relative to the mode diameter ((|mode diameter−D10|/mode diameter)×100) is 20 to 58%; and wherein a ratio (average primary particle diameter/D50) of an average primary particle diameter of the positive electrode active substance, which is calculated from a scanning-type electron microscope (SEM) image obtained by a SEM, relative to the D50 is 0.20 to 0.99.

Here, the term |mode diameter−D50| means an absolute value of (mode diameter−D50), and the term |mode diameter−D10| means an absolute value of (mode diameter−D10) (the same applies to the case that will be described below).

Also, the present invention proposes a positive electrode active substance for an all solid-state lithium secondary battery having an operating potential of 4.5 V or more at a metal Li reference potential, wherein the surface of the present core particles is coated with an amorphous compound containing Li, A (A represents one element or a combination of two or more elements selected from the group consisting of Ti, Zr, Ta, Nb, Zn, W, and Al), and O; a crystallite size of the positive electrode active substance is 80 to 490 nm; and a ratio (crystallite size/average primary particle diameter) of the crystallite size relative to an average primary particle diameter of the positive electrode active substance, which is calculated from a scanning-type electron microscope (SEM) image obtained by a SEM, is 0.01 to 0.32;

wherein, with regard to a D50, a mode diameter, and a D10 of the positive electrode active substance, the D50 is 0.5 to 9 μm, a percentage of a ratio of the absolute value of the difference between the mode diameter and the D50 relative to the mode diameter ((|mode diameter−D50|/mode diameter)×100) is 0 to 25%, a percentage of a ratio of the absolute value of the difference between the mode diameter and the D10 relative to the mode diameter ((|mode diameter−D10|/mode diameter)×100) is 20 to 58%; and wherein a ratio (average primary particle diameter/D50) of the average primary particle diameter of the positive electrode active substance relative to the D50 is 0.20 to 0.99.

The positive electrode active substance for an all solid-state lithium secondary battery proposed by the present invention is able to achieve both lithium ion conductivity improvement and resistance suppression; to reduce the contact resistance between the positive electrode active substance and the solid electrolyte; to maintain a high operating voltage during discharge; and to effectively improve the rate characteristics and cycle characteristics.

DESCRIPTION OF THE INVENTION

Figure 1:
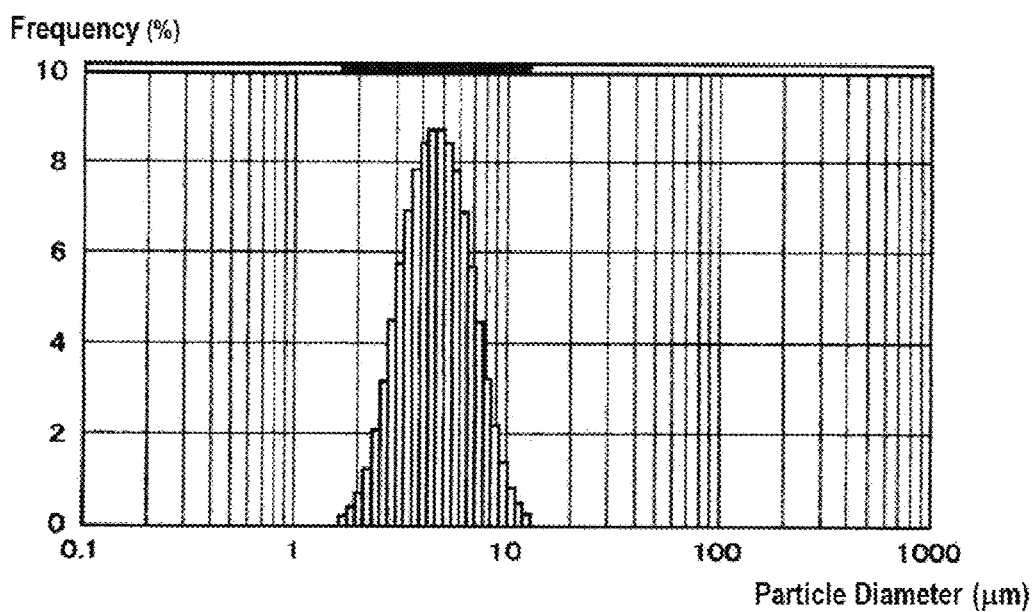
FIG. 1 shows a volume-based particle size distribution obtained by measuring a positive electrode active substance (sample), that is, a surface-coated spinel-type lithium manganese-containing composite oxide obtained in Example 2 using a laser diffraction scattering-type particle size distribution measurement method.

Next, the present invention will be described based on exemplary embodiments for carrying out the present invention. However, the present invention is not limited to the embodiments described below.

[Present Positive Electrode Active Substance]

The positive electrode active substance according to one example of the embodiments of the present invention is a positive electrode active substance to be used for an all solid-state lithium secondary battery using a solid electrolyte, and is a positive electrode active substance (referred to as "present positive electrode active substance") comprising a structure in which the surface of particles (referred to as "present core particles") composed of a spinel-type composite oxide containing Li, Mn, O, and two or more elements other than these is coated with an amorphous compound (referred to as "present amorphous compound") containing Li, an A element (A represents one element or a combination of two or more elements selected from the group consisting of Ti, Zr, Ta, Nb, Zn, W, and Al), and O; and having an operating potential of 4.5 V or more at a metal Li reference potential.

Here, the "having an operating potential of 4.5 V or more at a metal Li reference potential" is meant to include a case in which the present positive electrode active substance need not have only an operating potential of 4.5 V or more as a plateau region, and has a part of operating potential of 4.5 V or more.

From this viewpoint, the present positive electrode active substance is not limited to a positive electrode active substance composed only of a 5 V-class positive electrode active substance having an operating potential of 4.5 V or more as a plateau region. For example, a positive electrode active substance having an operating potential of less than 4.5 V as a plateau region may be contained. Specifically, it is allowed that the present positive electrode active substance may occupy 30% by mass or more, preferably 50% by mass or more, even more preferably 80% by mass or more (including 100% by mass) of the 5 V-class positive electrode active substance.

<Present Core Particles>

The present core particles are particles composed of a spinel-type composite oxide containing Li, Mn, O, and two or more elements other than these.

At least one element of the above "two or more elements other than these" may be an element M1 selected from the group consisting of Ni, Co, and Fe, and another element may be an element M2 composed of one element or a combination of two or more elements selected from the group consisting of Na, Mg, Al, P, K, Ca, Ti, V, Cr, Fe, Co, Cu, Ga, Y, Zr, Nb, Mo, In, Ta, W, Re, and Ce.

A preferred composition example of the present core particles may include a composition that contains a spinel-type lithium manganese-containing composite oxide having a crystal structure in which a part of the Mn site in $LiMn_2O_{4-\delta}$ is substituted with Li, the metal element M1, and the other metal element M2.

The metal element M1 is a substitution element mainly contributing in exhibiting an operating potential of 4.5 V or more at a metal Li reference potential, and examples thereof may include Ni, Co, and Fe. The metal element M1 may contain at least one of these elements, and particularly preferably contain at least one element of Ni and Co.

The metal element M2 is a substitution element mainly contributing in stabilizing the crystal structure to enhance the characteristics, and examples of the substitution element that contributes to an improvement in capacity retention rate may include Na, Mg, Al, P, K, Ca, Ti, V, Cr, Fe, Co, Cu, Ga, Y, Zr, Nb, Mo, In, Ta, W, Re, and Ce. The metal element M2 may contain at least one element selected from the group consisting of Na, Mg, Al, K, Ca, Ti, V, Cr, Fe, Co, Cu, Ga, Y, Zr, Nb, Mo, In, Ta, W, Re, and Ce, and may also contain other metal elements.

Here, the metal element M2 contained in the structure is a different element species from the metal element M1.

An example of the composition of the present core particles may be a composition containing a spinel-type lithium manganese-containing composite oxide represented by a formula (1): $Li_x(M1_yM2_zMn_{2-x-y-z})O_{4-\delta}$. M1 and M2 in the formula (1) are as described above.

In the formula (1), the parameter "x" may be 1.00 to 1.20. Among others, the parameter "x" is preferably 1.01 or more or 1.10 or less, more preferably 1.02 or more or 1.08 or less.

The parameter "y" that represents the content of M1 may be 0.20 to 1.20. Among others, the parameter "y" is preferably 0.30 or more or 1.10 or less, more preferably 0.35 or more or 1.05 or less.

The parameter "z" that represents the content of M2 may be 0.001 to 0.400. Among others, the parameter "z" is preferably 0.002 or more or 0.400 or less, more preferably 0.005 or more or 0.30 or less, even more preferably 0.10 or more. In particular, when the parameter "z" is 0.10 or more, the cycle characteristics can be more effectively enhanced.

Another example of the composition of the present core particles may be a composition containing a spinel-type lithium manganese-containing composite oxide represented by a formula (2): $[Li_x(Ni_yM_zMn_{3-x-y-z})O_{4-\delta}]$.

In the formula (2), the parameter "x" may be 1.00 to 1.20. Among others, the parameter "x" is preferably 1.01 or more or 1.10 or less, more preferably 1.02 or more or 1.08 or less.

In the formula (2), the parameter "y" may be 0.20 to 0.70. Among others, the parameter "y" is preferably 0.30 or more or 0.60 or less, more preferably 0.35 or more or 0.55 or less.

In the formula (2), M is preferably one element or a combination of two or more elements selected from the group consisting of Na, Mg, Al, P, K, Ca, Ti, V, Cr, Fe, Co, Cu, Ga, Y, Zr, Nb, Mo, In, Ta, W, Re, and Ce.

In the formula (2), the parameter "z" that represents a molar ratio of M is preferably more than 0 and 0.5 or less, more preferably more than 0.01 or 0.45 or less, even more preferably 0.05 or more or 0.40 or less, still more preferably 0.10 or more or 0.35 or less. In particular, when the parameter "z" is 0.10 or more, the cycle characteristics can be effectively enhanced.

Here, the "4-δ" in each formula indicates that the present core particles may also contain oxygen deficiency. A part of oxygen may be substituted with fluorine or other elements. In so doing, the parameter "δ" is preferably 0 or more or 0.2 or less, more preferably 0.1 or less, even more preferably 0.05 or less.

The present core particles may contain components other than Li, Mn, M, M1, M2, and O. In particular, the other elements may be contained if at 0.5% by weight or less respectively. This is conceivably because the amount in such degrees scarcely affect the performance of the present core particles.

In addition, the present core particles may contain B. In so doing, a composite oxide phase containing Ni, Mn, and B may be contained as a state where B is present, in addition to the spinel crystal phase. Examples of the composite oxide phase containing Ni, Mn, and B may include a crystal phase of $Ni_5MnO_4(BO_3)_2$.

Whether the crystal phase of $Ni_5MnO_4(BO_3)_2$ is contained can be confirmed by collating a diffraction pattern obtained by X-ray diffraction (XRD) with PDF (Powder Diffraction File) No. "01-079-1029".

The composite oxide containing Ni, Mn and B is inferred to be present on the surface or at the grain boundary of the present core particles.

In regard to the content of the composite oxide phase containing Ni, Mn, and B, the composite oxide phase is preferably contained such that the content of the B element in the present core particles is 0.02 to 0.80% by mass, more preferably 0.05% by mass or more or 0.60% by mass or less, even more preferably 0.30% by mass or less, particularly preferably 0.25% by mass or less.

When the content of the B element is 0.02% by mass or more, the discharge capacity at high temperature (for example, 45° C.) can be maintained, and when the content of the B element is 0.80% by mass or less, the rate characteristics can be maintained, which is preferable.

Here, whether or not a composite oxide constituting the present core particles has a spinel-type structure can be confirmed according to whether or not, for example, the range of Rwp or S which represents the degree of coincidence of an observed intensity with a calculated intensity is Rwp<10 or S<2.5 when fitting to a crystal structure model of a cubic crystal of a space group Fd-3m (Origin Choice 2).

The primary particles of the present core particles are preferably composed of a polycrystal rather than a single crystal.

Here, the single crystal means a state where the primary particles are constituted by one crystallite, and the polycrystal means a state where a plurality of crystallites are present in the primary particles.

Whether or not the present core particles are composed of a polycrystal can be confirmed by observing a cross section of the primary particles by electron back scattering diffraction (EBSD). When the present core particles are composed of a polycrystal, it can be confirmed that crystals having a plurality of orientations are present in the primary particles.

<Present Amorphous Compound>

As described above, the present positive electrode active substance has a structure in which the surface of the present core particles is coated with the present amorphous compound containing Li, an A element (A represents one element or a combination of two or more elements selected from the group consisting of Ti, Zr, Ta, Nb, Zn, W, and Al), and O.

The present amorphous compound may be present as particles, may be present as aggregated particles formed by aggregating particles, or may be present by forming a layer, on the surface of the present core particles.

Here, the "present by forming a layer" means a state in which the present amorphous compound is present with a thickness.

In addition, when almost the whole surface of the present core particles is coated with the present amorphous compound, there may be areas where the present amorphous compound is not present on a part of area or several partial areas of the surface of the present core particles. Here, whether the surface of the present core particles is coated with the present amorphous compound can be confirmed by observing the surface of the present core particles by using, for example, an electron microscope. Further, the thickness of the present amorphous compound to be coated on the surface of the present core particles may not be uniform.

The present amorphous compound is preferably amorphous. By being amorphous, the present amorphous compound is present as a buffer layer between the positive electrode active substance and the solid electrolyte, and thus the reaction resistance can be reduced.

Whether a compound to be coated on the surface of the present core particles is crystalline or amorphous can be judged by confirming whether a halo pattern can be obtained by selected area electron diffraction. Here, the halo pattern means a low-angle and broad diffraction pattern having no clear diffraction peak.

The present amorphous compound preferably contains Li, an A element (A represents one or more elements selected from the group consisting of Ti, Zr, Ta, Nb, Zn, W, and Al), and O.

When the A element is at least one element of Ta and Nb, the composition of the present amorphous compound can be represented by, for example, $Li_xAO_y$. Typically, $LiAO_3$, that is, the composition when x=1 and y=3 can be assumed. However, because the compound is an amorphous compound, the parameters x and y in the formula can take arbitrary values in ranges according to valences of the elements. Among others, a composition (1<x) containing Li in excess of 1 mol relative to 1 mol of the A element is more preferred.

Examples of the method for satisfying 1<x in the amorphous compound of $Li_xAO_y$ may include a method in which the blending amount of the lithium raw material with respect to the A element raw material is adjusted such that the amount of Li becomes excessive as compared with a composition assumed to be generated of lithium carbonate, for example, a stoichiometric composition ratio of $LiAO_3$.

However, when an excessive amount of Li is merely added, lithium carbonate caused by the excessive amount of Li is generated on the surface of the present positive electrode active substance to become resistance, and instead, the rate characteristics and the cycle characteristics tend to deteriorate. Thus, by taking this point, that is, the generation of lithium carbonate into consideration, it is preferable to adjust the blending amount of the A element raw material and the blending amount of the lithium raw material such that the amorphous compound has a predetermined composition.

<Present Positive Electrode Active Substance>

The present positive electrode active substance preferably has the following features.

(Crystallinity)

The primary particles of the present positive electrode active substance are preferably composed of a polycrystal rather than a single crystal. More specifically, it is preferable that the amorphous compound which is amorphous is present on the surface of the core particles which are polycrystalline.

Whether or not the primary particles of the present positive electrode active substance are not composed of a single crystal, that is, the primary particles thereof are composed of a polycrystal can be judged by confirming whether a ratio of the crystallite size to the average primary particle diameter (crystallite size/average primary particle diameter) is nearly 0, specifically within a range of higher than 0 and lower than 1. The ratio which is nearly 0 indicates that a large number of crystallites are contained in the primary particles. However, the present invention is not limited to this judging method.

Here, the "primary particles" as used in the present invention means particles of the smallest unit that are surrounded by grain boundaries when observed with a SEM (scanning electron microscope, for example, a magnification of 500 to 5,000 times).

Further, the average primary particle diameter can be determined by observing with a SEM (scanning electron microscope, for example, a magnification of 500 to 5,000 times), selecting arbitrary 30 primary particles, calculating particle diameters of the selected primary particles using an image analysis software, and averaging the primary particle diameters of the 30 particles.

On the other hand, the "secondary particles" as used in the present invention means particles in which plural primary particles are aggregated so as to share portions of the outer peripheries (grain boundaries) of the respective particles, and are segregated from other particles.

The D50 according to the volume-based particle size distribution, which can be obtained via measurements by a laser diffraction scattering-type particle size distribution measurement method, has a meaning as a substitute value of the average diameter of particles including these primary particles and secondary particles.

In addition, the "crystallite" means a largest aggregation which can be regarded as a single crystal, and can be determined by XRD measurement and Rietveld analysis.

(Mode Diameter)

A mode diameter of the present positive electrode active substance, that is, a mode diameter according to a measurement of a volume-based particle size distribution obtained via measurements by a laser diffraction scattering-type particle size distribution measurement method is preferably 0.4 to 11 µm.

In regard to the present positive electrode active substance, when the mode diameter is adjusted within the above range, the resistance when Li is diffused in the secondary particles can be reduced, and as a result, the operating voltage during discharge can be maintained high.

From such a viewpoint, the mode diameter of the present positive electrode active substance is preferably 0.4 to 11 µm. Among others, it is more preferably 1 µm or more or 10 µm or less, even more preferably 2 µm or more or 9 µm or less, still more preferably less than 8 µm.

(D50)

A D50 of the present positive electrode active substance, that is, a D50 according to a measurement of a volume-based particle size distribution obtained via measurements by a laser diffraction scattering-type particle size distribution measurement method is preferably 0.5 to 9 µm.

In regard to the present positive electrode active substance, when the D50 is adjusted within the above range, the resistance when Li is diffused in the secondary particles can be reduced, and as a result, the operating voltage during discharge can be maintained high.

From such a viewpoint, the D50 of the present positive electrode active substance is preferably 0.5 to 9 µm. Among others, it is more preferably 0.6 µm or more or 8 µm or less, even more preferably more than 1 µm or less than 8 µm, still more preferably more than 2 µm or less than 7 µm.

(|Mode Diameter−D50|/Mode Diameter)

In regard to the present positive electrode active substance, a percentage of a ratio of the absolute value of the difference between the mode diameter and the D50 relative to the mode diameter ((|mode diameter−D50|/mode diameter)×100) is preferably 0 to 25%.

The case where the percentage of the ratio of the absolute value of the difference between the mode diameter and the D50 relative to the mode diameter ((|mode diameter−D50|/mode diameter)×100) is 25% or less indicates that the particle size distribution shows a single-peaked pattern, that is, a distribution having no plural peaks, and moreover, a normal distribution or a distribution similar to it.

From such a viewpoint, in regard to the present positive electrode active substance, the percentage of the ratio of the absolute value of the difference between the mode diameter and the D50 relative to the mode diameter ((|mode diameter−D50|/mode diameter)×100) is preferably 0 to 25%. Among others, it is more preferably more than 0% or less than 20%, even more preferably more than 0.01% or less than 17%, still more preferably more than 0.05% or less than 15%, particularly preferably more than 0.1% or 10% or less.

(D10)

A D10 of the present positive electrode active substance, that is, a D10 according to a measurement of a volume-based particle size distribution obtained via measurements by a laser diffraction scattering-type particle size distribution measurement method is preferably 0.2 to 4.0 µm.

In regard to the present positive electrode active substance, when the D10 is adjusted within the above range, the cycle characteristics can be improved.

From such a viewpoint, the D10 of the present positive electrode active substance is preferably 0.2 to 4.0 µm. Among others, it is more preferably 0.25 µm or more or less than 4.0 µm, even more preferably 0.3 µm or more or less than 3.5 µm.

(|Mode Diameter−D10|/Mode Diameter)

In regard to the present positive electrode active substance, a percentage of a ratio of the absolute value of the difference between the mode diameter and the D10 relative to the mode diameter ((|mode diameter−D10|/mode diameter)×100) is preferably 20 to 58%.

The case where the percentage of the ratio of the absolute value of the difference between the mode diameter and the D10 relative to the mode diameter ((|mode diameter−D10|/mode diameter)×100) is 20 to 58% indicates that the width of the distribution from the mode diameter of the present positive electrode active substance to the D10 thereof is narrow.

In addition, by adjusting the percentage of the ratio of the absolute value of the difference between the mode diameter and the D50 relative to the mode diameter ((|mode diameter−D50|/mode diameter)×100) to the above range, or by adjusting the percentage of the ratio of the absolute value of the difference between the mode diameter and the D10 relative to the mode diameter ((|mode diameter−D10|/mode diameter)×100) to the above range, the particle size distribution becomes a distribution similar to a normal distribution and having a narrow peak. In other words, the sizes of the primary particles and the secondary particles can be uniformized.

This indicates that a ratio of a fine powder region in the whole particle size distribution can be reduced. Since a fine powder affects negatively to the cycle characteristics, by reducing a ratio occupied by the fine powder, the cycle characteristics can be improved.

From such a viewpoint, in regard to the present positive electrode active substance, the percentage of the ratio of the absolute value of the difference between the mode diameter and the D10 relative to the mode diameter ((|mode diameter−D10|/mode diameter)×100) is preferably 20 to 58%. Among others, it is more preferably more than 22% or less than 56%, even more preferably more than 25% or less than 52%, still more preferably more than 30% or less than 50%, particularly preferably more than 35% or 47% or less.

(Dmin)

A Dmin of the present positive electrode active substance, that is, a Dmin according to a measurement of a volume-based particle size distribution obtained via measurements by a laser diffraction scattering-type particle size distribution measurement method is preferably 0.1 to 2.0 µm.

In regard to the present positive electrode active substance, when the Dmin is adjusted within the above range, the cycle characteristics can be enhanced.

From such a viewpoint, the Dmin of the present positive electrode active substance is preferably 0.1 to 2.0 µm. Among others, it is more preferably 0.15 µm or more or less than 2.0 µm, even more preferably 0.2 µm or more or less than 1.9 µm, still more preferably more than 0.6 µm or less than 1.8 µm.

In order to adjust the particle size distribution of the secondary particles of the present positive electrode active substance as described above, for example, the particles may be calcined and pulverized, and may be subjected to a heat treatment after the pulverization. However, the present invention is not limited to such a method.

(Average Primary Particle Diameter)

An average primary particle diameter of the present positive electrode active substance, that is, an average primary particle diameter calculated from a SEM image is preferably 0.3 to 5.0 µm.

In regard to the present positive electrode active substance, both the rate characteristics and the cycle characteristics can be improved by adjusting the average primary particle diameter within the above range.

From such a viewpoint, the average primary particle diameter of the present positive electrode active substance is preferably 0.3 to 5.0 µm. Among others, it is more preferably more than 0.5 µm or less than 4.0 µm, even more preferably more than 0.7 µm or less than 3.5 µm, still more preferably more than 0.9 µm or less than 3.0 µm.

(Average Primary Particle Diameter/D50)

In regard to the present positive electrode active substance, a ratio (average primary particle diameter/D50) of the average primary particle diameter relative to the D50 is preferably 0.20 to 0.99.

By specifying the ratio of average primary particle diameter/D50 within the above range, the dispersibility of the primary particles can be enhanced. Thus, each and every primary particle can be sufficiently brought into contact with a solid electrolyte as compared to the case where the secondary particles occupies more than a half of the particle size distribution. Accordingly, a reaction area of Li with the particles is increased, and a resistance on the interface of the primary particles in the secondary particles can be decreased, so that the operating voltage during discharge can be maintained high.

From such a viewpoint, the ratio of average primary particle diameter/D50 of the present positive electrode active substance is preferably 0.20 to 0.99. Among others, it is more preferably 0.21 or more or 0.98 or less, even more preferably 0.22 or more or 0.97 or less.

In order to adjust the average primary particle diameter of the present positive electrode active substance as described above, it is preferable to produce the present positive electrode active substance by adjusting the calcination temperature, or adding a material which enhances the reactivity in calcination, such as a boron compound or a fluorine compound, followed by calcining. However, the present invention is not limited to the method.

(Crystallite Size)

In regard to the present positive electrode active substance, a crystallite size is preferably 80 to 490 nm.

By specifying the crystallite size within the above range, the ion conductivity in the crystallite can be enhanced, and thus the resistance can be reduced. In addition, polarization during the cycle can be suppressed by reducing the resistance, and the discharge capacity can be suppressed from being gradually lowered by repetition of charging and discharging at high temperature.

From such a viewpoint, the crystallite size of the present positive electrode active substance is preferably 80 to 490 nm. Among others, it is more preferably 81 nm or more or 350 nm or less, even more preferably 82 nm or more or 250 nm or less, still more preferably more than 100 nm or less than 200 nm.

Here, the "crystallite" means a largest aggregation which can be regarded as a single crystal, and can be determined by XRD measurement and Rietveld analysis.

(Crystallite Size/Average Primary Particle Diameter)

In the present positive electrode active substance, a ratio (crystallite size/average primary particle diameter) of the average primary particle diameter relative to the crystallite size is preferably 0.01 to 0.32.

As described above, since the present positive electrode active substance is composed of a polycrystal, the ratio of crystallite size/average primary particle diameter becomes less than 1, and when the ratio is within the above range, the dispersibility of the primary particles in the powder becomes good, a contact area between the primary particles and a solid electrolyte is increased, a resistance on the interface of the primary particles in the secondary particles can be decreased, and the operating voltage during discharge can be maintained high.

From such a viewpoint, the ratio of crystallite size/average primary particle diameter in the present positive electrode active substance is preferably 0.01 to 0.32. Among others, it is more preferably more than 0.02 or less than 0.22, even more preferably more than 0.04 or less than 0.15.

In regard to the present positive electrode active substance, in order to adjust the crystallite size to the above range, it is preferable to adjust a calcination temperature, a calcination time, a supporting agent which enhances reactivity, a calcination atmosphere, a raw material species, and the like. However, the present invention is not limited to these methods.

(Strain)

In regard to the present positive electrode active substance, in an X-ray diffraction pattern measured by a powder X-ray diffractometer (XRD), a value of a strain obtained by Rietveld analysis is preferably 0.00 to 0.35.

When the strain is small to this extent, the framework of the spinel-type lithium manganese-containing composite oxide is sufficiently rigid. Thus, when used as a positive electrode active substance of a lithium secondary battery, the operating voltage during discharge can be maintained high, and the cycle characteristics can be further enhanced.

From such a viewpoint, the strain of the present positive electrode active substance is preferably 0.00 to 0.35. Among others, it is more preferably less than 0.30, even more preferably less than 0.25, still more preferably less than 0.20, furthermore preferably less than 0.15.

In order to adjust the strain of the present positive electrode active substance to the above range, a heat treatment may be performed under preferred conditions. However, the present invention is not limited to the method.

(Specific Surface Area)

From the viewpoint of suppressing side reactions, a specific surface area of the present positive electrode active substance is preferably 0.4 to 6.0 $m^2/g$. Among others, it is more preferably 0.5 $m^2/g$ or more or 5.0 $m^2/g$ or less, even more preferably 4.5 $m^2/g$ or less, still more preferably 4.0 $m^2/g$ or less.

(Surface Composition)

In the present positive electrode active substance having a structure in which the surface of the present core particles is coated with the present amorphous compound, by controlling a ratio between Li and the A element in the present positive electrode active substance surface within a predetermined range, both the lithium ion conductivity improvement and the resistance suppression can be achieved. Also, by reducing the contact resistance between the positive electrode active substance and the solid electrolyte, the operating voltage during discharge can be maintained high, and the rate characteristics and the cycle characteristics can be effectively improved.

That is, the molar ratio (Li/A) of the Li content relative to the A element content in the surface of the present positive electrode active substance (particles), as obtained by X-ray photoelectron spectroscopy (XPS), is preferably 0.5 to 3.5. Among others, it is more preferably more than 0.7 or 3.4 or less, even more preferably more than 1.0 or less than 3.0, still more preferably more than 1.1 or less than 2.5, furthermore preferably more than 1.2 or less than 2.1.

Here, the molar ratio (Li/A) is a value also including Li derived from lithium carbonate.

In order to control the ratio between Li and the A element in the surface of the present positive electrode active substance within the range, it is preferable to adjust the blending amount of the A element raw material and the blending amount of the lithium raw material such that the molar ratio (Li/A) falls within the range while considering the Li amount derived from lithium carbonate to be generated on the present positive electrode active substance surface, as described above. By doing so, the rate characteristics and the cycle characteristics can be remarkably improved.

(Amount of Carbonate Ions: Amount of $CO_3^{2-}$)

When the amount of carbonates (such as lithium carbonate and sodium carbonate) present on the surface of the positive electrode active substance is large, it may become a resistance to lower the lithium ion conductivity. Thus, the amount of carbonate ions considered to be derived from the carbonates, that is, the amount of $CO_3^{2-}$ is preferably less than 2.5 wt %, more preferably less than 1.5 wt %, even more preferably less than 1.0 wt %, still more preferably less than 0.6 wt %, relative to the total amount of the present positive electrode active substance.

In order to reduce the amount of carbonate ions present on the surface of the present positive electrode active substance, for example, calcining under an atmosphere not containing carbon dioxide, such as an oxygen atmosphere, is preferred, and hydrolyzing while irradiating ultrasonic waves is further preferred.

[Method for Producing Present Positive Electrode Active Substance]

The present positive electrode active substance can be produced by subjecting the present core particles to a surface coating treatment in such a manner that, for example, the present core particles are added to a mixed solution in which a lithium raw material and an A element raw material are dissolved in a solvent, and the resulting mixture is then dried and calcined under predetermined conditions. However, such a production method is a preferred example, and the present invention is not limited to such a production method. The present positive electrode active substance can also be produced by, for example, a tumbling fluidized coating method (sol-gel method), a mechano-fusion method, a CVD method, a PVD method, or the like by adjusting the conditions.

<Method for Producing Present Core Particles>

As an example of the method for producing the present core particles, a production method including a raw material mixing step, a wet pulverization step, a granulation step, a calcination step, a heat treatment step, washing and drying steps, and a pulverization step, can be cited. However, such a production method is a preferred example, and the present invention is not limited to such a production method.

(Raw Material)

Here, raw materials for producing a substance containing a spinel-type lithium manganese-containing composite oxide represented by a formula (1): $[Li_x(M1_yM2_zMn_{2-x-y-z})O_{4-\delta}]$ or a formula (2): $[Li_x(Ni_yM_zMn_{2-x-y-z})O_{4-\delta}]$ will be described. However, since the present positive electrode active substance, which is the production object of the present invention, is not limited to the substances represented by the formulae (1) and (2), the raw materials can be appropriately changed.

Examples of the raw materials for producing a spinel-type lithium manganese-containing composite oxide represented by the formula (1): $[Li_x(M1_yM2_zMn_{2-x-y-z})O_{4-\delta}]$ or the formula (2): $[Li_x(Ni_yM_zMn_{2-x-y-z})O_{4-\delta}]$ may include lithium raw materials, nickel raw materials, manganese raw materials, M element raw materials, M1 element raw materials, M2 element raw materials, and other raw materials such as boron raw materials.

Examples of the lithium raw materials may include lithium hydroxide (LiOH, LiOH.H$_2$O), lithium carbonate (Li$_2$CO$_3$), lithium nitrate (LiNO$_3$), lithium oxide (Li$_2$O), and besides, fatty acid lithium and lithium halides.

Examples of the manganese raw materials may include manganese carbonate, manganese nitrate, manganese chloride, manganese dioxide, dimanganese trioxide, and trimanganese tetroxide. Among others, manganese carbonate and manganese dioxide are preferable. Among others, electrolytic manganese dioxide that is obtained by an electrolytic method is particularly preferable.

Examples of the M1 element raw materials, the M2 element raw materials, and the M element raw materials may include carbonate, nitrate, chloride, oxyhydroxide salt, hydroxide, and oxide of the M element.

In addition, a boron compound may be blended into the raw materials.

The boron compound may be a compound containing boron (B element), and for example, it is preferable to use boric acid or a lithium borate. As the lithium borate, various forms thereof, for example, lithium metaborate (LiBO$_2$), lithium tetraborate (Li$_2$B$_4$O$_7$), lithium pentaborate (LiB$_5$O$_8$), and lithium perborate (Li$_2$B$_2$O$_5$) can be used.

When such a boron compound is blended, the composite oxide phase containing Ni, Mn, and B, for example, a crystal phase of Ni$_5$MnO$_4$(BO$_3$)$_2$ may be generated in addition to the crystal phase of the present core particles.

(Raw Material Mixing Step)

The method for mixing the raw materials is not especially limited as long as the raw materials can be uniformly mixed. For example, the respective raw materials may be added simultaneously or in an appropriate order, and may be stirred and mixed in a wet mode or a dry mode, using a known mixing machine such as a mixer, to serve as a raw material mixed powder. When an element that is not easily substitutable, for example, aluminum, is added, it is preferable to employ wet mixing.

As the dry mixing, for example, a mixing method using a precision mixing machine which rotates the raw material mixed powder at a high speed can be exemplified.

Meanwhile, as the wet mixing, a method for adding the raw material mixed powder to a liquid medium such as water or a dispersant, and performing wet mixing to obtain a slurry, can be cited.

(Wet Pulverization Step)

In the wet pulverization step, the raw materials may be pulverized in the presence of a liquid medium such as water. The wet pulverization may be performed before mixing the raw materials, or may also be performed after mixing the raw materials.

In the case of performing the wet pulverization after mixing the raw materials, the raw material mixed powder is added to a liquid medium such as water or a dispersant, and is wet mixed to obtain a slurry as described above; and then the obtained slurry may be pulverized using a wet-type pulverizer. At this time, it is particularly preferable to pulverize the slurry to submicron order. By granulating and calcining the obtained slurry after pulverizing to submicron order, the uniformity of the respective particles before the calcination reaction can be increased, and the reactivity can be enhanced.

Meanwhile, in the case of performing the wet pulverization before mixing the raw materials, the respective raw materials may be wet pulverized respectively and mixed. Thereafter, the resulting materials may be further wet pulverized as necessary.

In the case of pulverizing the respective raw materials respectively, in order to enhance the homogeneity in raw material mixing, it is preferable to pulverize a raw material having a large Dmax in advance before mixing the raw materials. For example, it is preferable that only a nickel compound, or a nickel compound and a manganese compound as necessary are pulverized and classified to adjust the maximum particle diameters (Dmax) of the nickel compound and the manganese compound so as to be 10 μm or less, more preferably 5 μm or less, even more preferably 4 μm or less.

(Granulation Step)

It is preferable that the raw materials mixed as described above are calcined after being granulated to a predetermined size as necessary. However, the granulation may not be necessarily performed.

The granulation method may be a wet-type method or a dry-type method as long as various raw materials that are pulverized in the previous step are dispersed in the granulated particles, and may be an extrusion granulation method, a rolling granulation method, a fluidized bed granulation method, a mixing granulation method, a spray drying granulation method, a pressure molding granulation method, or a flake granulation method using a roll or the like. However, in the case of performing the wet-type granulation, sufficient drying before the calcination is needed.

The drying may be performed by known drying methods such as a spray thermal drying method, a hot-air drying method, a vacuum drying method, and a freeze-drying method, and among others, a spray thermal drying method is preferred. The spray thermal drying method is preferably performed using a thermal spray drying machine (spray dryer). When the granulation is performed using the thermal spray drying machine (spray dryer), a particle size distribution can be sharper, and a configuration of secondary particles can be prepared so as to include aggregated particles (secondary particles) that are aggregated in a round shape.

(Calcination Step)

The calcination is preferably performed in a calcining furnace under an air atmosphere, an atmosphere whose oxygen partial pressure is adjusted, a carbon dioxide gas-containing atmosphere, or other atmospheres, so as to maintain a temperature of higher than 750° C. and 1,000° C. or less, preferably 800 to 1,000° C. (meaning the temperature when a thermocouple is brought into contact with a calcination product in a calcining furnace) for 0.5 to 300 hours. In so doing, it is preferable to select calcining conditions in which transition metals are dissolved at an atomic level to form a single phase.

When the primary particles are small, there is a possibility that fine particles that cause deterioration of the cycle characteristics are easily generated. Thus, the calcination temperature is preferably higher than 750° C., more preferably 800° C. or more, even more preferably 840° C. or more.

However, when the calcination temperature is too high, there is a possibility that oxygen deficiency is increased and the strain cannot be recovered even by the heat treatment. Therefore, it is preferable to calcine at a temperature of 1,000° C. or less, more preferably 980° C. or less.

Here, the calcination temperature means a temperature of a calcined product measured by bringing a thermocouple into contact with the calcined product inside a calcination furnace.

The calcination time, that is, the time for maintaining the calcination temperature may vary with the calcination temperature, but it may be 0.5 to 100 hours.

The kind of the calcination furnace is not particularly limited. The calcination can be performed by using, for example, a rotary kiln, a stationary furnace, or other calcination furnaces.

Meanwhile, in the case of coexisting materials which enhance the reactivity in calcination, such as a boron compound and a fluorine compound, the specific surface area can be lowered even at low temperature. In such a case, it is preferable to calcine at a calcination temperature of higher than 750° C., more preferably 800° C. or more, even more preferably 820° C. or more. However, when the calcination temperature is too high, there is a possibility that oxygen deficiency is increased and the strain cannot be recovered even by the heat treatment. Therefore, it is preferable to calcine at a temperature of 980° C. or less, more preferably 960° C. or less.

On the other hand, when the materials which enhance the reactivity in calcination as described above are not coexisted, it is preferable to calcine at a temperature of higher than 800° C., more preferably 820° C. or more, even more preferably 840° C. or more. However, when the calcination temperature is too high, there is a possibility that oxygen deficiency is increased and the strain cannot be recovered even by the heat treatment. Therefore, it is preferable to calcine at a temperature of 1,000° C. or less, more preferably 980° C. or less.

After the calcination, it is preferable to perform a crushing as necessary. By crushing a sintered mass or the like after calcination, oxygen can be easily incorporated into powder, and then it is possible to suppress oxygen deficiency and to decrease strain in a heat treatment step that will be described later. In the present step, the crushing is preferably performed so as not to crush the secondary particles.

(Heat Treatment Step)

The heat treatment is preferably performed under an air atmosphere, an atmosphere whose oxygen partial pressure is adjusted, or other atmospheres, in an environment of 500 to 800° C., preferably 700° C. or more or 800° C. or less for 0.5 to 300 hours so as to easily incorporate oxygen into the crystal structure. At this time, when the temperature is lower than 700° C., the effect of the heat treatment is not easily obtained, and there is a risk that oxygen may not be incorporated. In addition, when the heat treatment is performed at a temperature higher than 800° C., desorption of oxygen begins, and the effect intended by the present invention cannot be obtained.

In the heat treatment, the heat treatment atmosphere may be set to an atmosphere where the overall pressure of the treatment atmosphere is a pressure higher than air pressure (0.1 MPa), for example, more than 0.19 MPa, preferably 0.20 MPa or more, as necessary.

However, when the overall pressure of the treatment atmosphere is too high, there is a possibility that the production becomes unstable due to a problem on strength of the pressurized furnace. Therefore, from such a viewpoint, the heat treatment is preferably performed at an atmosphere pressure of 1.5 MPa or less, more preferably 1.0 MPa or less.

By performing the heat treatment in such a pressuring state, oxygen is more easily incorporated, and thus the oxygen deficiency can be further suppressed.

(Crushing and Classification Steps)

After the heat treatment step, it is preferable to crush the substance, as necessary.

In so doing, the crushing is preferably performed to an extent that the secondary particles should not be broken.

Then, it is preferable to classify the substance after crushing.

(Washing and Drying Steps)

In the washing step, it is preferable to bring an object to be treated (also referred to as "treated powder") into contact with a polar solvent, and to wash the powder so as to separate impurities contained in the treated powder.

For example, the treated powder and a polar solvent are mixed and stirred to obtain a slurry, and the slurry thus obtained may be subjected to solid-liquid separation by filtration or the like, so as to eliminate impurities. In so doing, the solid-liquid separation may be performed at a subsequent step.

Here, the slurry means a state in which the treated powder is dispersed in the polar solvent.

For the polar solvent to be used for washing, water is preferably used.

The water may be tap water, but it is preferable to use ion-exchanged water or pure water that has been passed through a filter or a wet-type magnetic separator.

The pH of water is preferably 4 to 10, and among others, the pH is more preferably 5 or more or 9 or less.

As for the liquid temperature at the time of washing, it has been confirmed that when the liquid temperature at the time of washing is low, the battery characteristics become more satisfactory. Therefore, from such a viewpoint, the liquid temperature is preferably 5° C. to 70° C. Among others, it is more preferably 60° C. or less, even more preferably 45° C. or less. In particular, it is furthermore preferably 40° C. or less. Also, it is particularly preferably 30° C. or less.

The reason why the battery characteristics become more satisfactory when the liquid temperature at the time of washing is low, can be considered that when the liquid temperature is too high, lithium in the lithium manganese-containing composite oxide is ion-exchanged with protons of the ion-exchanged water, thereby the lithium is removed, which affects high temperature characteristics.

As for the amount of the polar solvent that is brought into contact with the object to be treated (treated powder), it is preferable to adjust the mass ratio (also referred to as "slurry concentration") of the lithium manganese-containing composite oxide relative to the total of the lithium manganese-containing composite oxide and the polar solvent to 10 to 70 wt %, more preferably 20 wt % or more or 60 wt % or less, even more preferably 30 wt % or more or 50 wt % or less. When the slurry concentration is 10 wt % or more, impurities such as $SO_4$ are easily eluted, and on the contrary, when the slurry concentration is 60 wt % or less, a washing effect adequate for the amount of the polar solvent can be obtained.

When the object to be treated is washed, it may be introduced into a washing liquid, followed by stirred, left to stand, and then a supernatant may be removed. For example, the spinel-type lithium manganese-containing composite oxide is introduced into a washing liquid, stirred for 20 minutes, and left to stand for 10 minutes. Thereafter, it is preferable to remove the spinel-type lithium manganese-containing composite oxide contained in the supernatant. By removing the spinel-type lithium manganese-containing composite oxide contained in the supernatant as described above, the amount of a spinel-type lithium manganese-containing composite oxide having an incomplete crystal structure that causes deterioration of the cycle characteristics when being constituted in a battery can be decreased. The spinel-type lithium manganese-containing composite oxide recovered by the solid-liquid separation is preferably heated to 300° C. or more to sufficiently remove moisture.

(Pulverization Step)

In the pulverization step, it is preferable to pulverize the object using an airflow-type pulverizer, a classification mechanism-equipped collision-type pulverizer, for example, a jet mill, a classifying rotor-equipped counter jet mill, or the like. When the pulverization is performed using a jet mill, an aggregation of the primary particles or a part where the degree of the calcination is weak can be pulverized. However, it is not limited to a jet mill. Pulverizers such as a pin mill and a planetary ball mill can also be used.

An example of the jet mill may be a classifying rotor-equipped counter jet mill. The counter jet mill is known as a pulverizer utilizing a collision of compressed gas flow. Raw materials supplied from a raw material hopper to the mill are fluidized by injection air from the nozzle. In so doing, the counter jet mill is placed such that the injection air converges to one point. Thus, the particles accelerated during the jet collide each other, and the particles can be finely pulverized.

The rotation speed of the classifier of the counter jet mil is preferably 7,000 rpm or more. Among others, it is more preferably 8,000 rpm or more or 18,000 rpm or less, even more preferably 9,000 rpm or more or 18,000 rpm or less.

(Oxygen-Containing Atmosphere Heat Treatment Step after Pulverization Step)

After the pulverization step, a heat treatment may be performed in an oxygen-containing atmosphere as necessary.

By performing a heat treatment in an oxygen-containing atmosphere after the pulverization step, oxygen can be incorporated into the structure, and a strain caused by the pulverization can be further reduced.

In the oxygen-containing atmosphere heat treatment step after the pulverization step, it is preferable to perform a heat treatment at a temperature of higher than 500° C. and lower than 850° C. in a treatment atmosphere in which the overall pressure in the treatment atmosphere is air pressure or higher than air pressure and the oxygen partial pressure in the atmosphere is higher than the oxygen partial pressure in air pressure.

By performing the heat treatment in an oxygen-containing atmosphere as described above, oxygen is incorporated into the structure of the present core particles, and thus the oxygen deficiency is decreased and the structure is stabilized. Therefore, even in the case of calcining at high temperature or even after pulverizing as described above, the strain in the structure can be eliminated, so that the resistance can be reduced and the cycle characteristics can be improved.

Here, the pressure atmosphere which is higher than air pressure includes a case where the pressure becomes a pressure higher than air pressure by heating an inside of sealed container and rising a temperature of gas in a certain volume for increasing the pressure.

Here, in the atmosphere having a pressure higher than air pressure, the overall pressure of the atmosphere is preferably a pressure higher than air pressure (0.1 MPa), for example, more than 0.19 MPa, and more preferably 0.20 MPa or more. However, when the overall pressure of the treatment atmosphere is too high, there is a possibility that the production becomes unstable due to a problem on strength of the pressurized furnace. Therefore, from such a viewpoint, the heat treatment is preferably performed at an atmosphere pressure of 1.5 MPa or less, more preferably 1.0 MPa or less. As such, by performing the heat treatment in a state of pressuring in an oxygen-containing atmosphere, oxygen is more easily incorporated, and thus the oxygen deficiency can be further suppressed. From such a viewpoint, the overall pressure in the atmosphere during the oxygen-containing atmosphere pressure heat treatment is preferably controlled to higher than 0.19 MPa and 1.5 MPa or less, more preferably 0.20 MPa or more or 1.3 MPa or less, even more preferably 1.0 MPa or less.

Further, in the atmosphere having a pressure higher than air pressure, it is preferable that the oxygen partial pressure is, for example, higher than 0.19 MPa, and more preferably 0.20 MPa or more. However, when the oxygen partial pressure is too high, there is a possibility that the production becomes unstable due to a problem on strength of the pressurized furnace. Therefore, from such a viewpoint, the heat treatment is preferably performed under an oxygen partial pressure of 1.5 MPa or less, more preferably 1.0 MPa or less.

From such a viewpoint, the oxygen partial pressure in the post-pulverizing oxygen-containing atmosphere heat treatment step is preferably controlled to higher than 0.19 MPa and 1.5 MPa or less, more preferably 0.20 MPa or more or 1.3 MPa or less, even more preferably 1.0 MPa or less.

The heat treatment temperature in the oxygen-containing atmosphere heat treatment step after the pulverization step, that is, the retention temperature is preferably controlled to a temperature higher than 500° C. and lower than 850° C.

When the heat treatment temperature in the present step is higher than 500° C., and when the heat treatment is performed while forcibly supplying oxygen, the strain can be effectively decreased by incorporating oxygen into the crystal structure.

From such a viewpoint, the heat treatment temperature is preferably higher than 500° C., more preferably higher than 550° C., even more preferably higher than 600° C., still more preferably higher than 620° C.

Meanwhile, when the heat treatment temperature is too high, there is a possibility that oxygen deficiency is increased, and the strain cannot be recovered even by the heat treatment. Therefore, the heat treatment temperature is preferably lower than 850° C., more preferably lower than 820° C., even more preferably lower than 800° C.

Here, the heat treatment temperature means a product temperature of the treated object which is measured by bringing a thermocouple into contact with the treated object in the furnace.

An example of the preferred conditions in the oxygen-containing atmosphere heat treatment step after the pulverization step may be a condition where the overall pressure in the treatment atmosphere is higher than air pressure, the oxygen partial pressure is higher than 0.19 MPa, and the oxygen-containing atmosphere pressure heat treatment is performed at a temperature higher than 500° C. and lower than 850° C., among others, higher than 550° C. or lower than 850° C., and still among others, higher than 600° C. or lower than 800° C.

The temperature-rise rate when heating to the heat treatment temperature, that is, the retention temperature is preferably 0.1 to 20° C./min, more preferably 0.25° C./rain or more or 10° C./min or less, even more preferably 0.5° C./min or more or 5° C./rain or less.

The time for maintaining the heat treatment temperature in the oxygen-containing atmosphere heat treatment step after the pulverization step needs to be at least 1 minute or more. In order to incorporate oxygen into the crystal structure sufficiently, it is considered that at least one minute is necessary. From such a viewpoint, the retention time of the heat treatment temperature is preferably 5 minutes or more, more preferably 10 minutes or more. Further, it is considered that when the retention time is 200 hours or less, an effect in which oxygen is incorporated into the crystal structure is sufficiently obtained.

As for the temperature-fall rate after heat treatment, it is preferable to cool slowly at a cooling rate of 10° C./min or less at least to 500° C., and it is more preferable to control the cooling rate of 0.1 to 8° C./rain, even more preferably 0.2 to 5° C./rain.

Since it is considered that the oxygen thus incorporated is stabilized at near 500° C., it can be considered that it is preferable to cool slowly at a temperature-fall rate of 10° C./min or less at least to 500° C.

The heat treatment in the oxygen-containing atmosphere heat treatment step after the pulverization step as described above can be performed by heating using an apparatus such as a pressurized furnace (pressurizable pressure is 1.0 MPa) at a treatment atmosphere where the overall pressure in the treatment atmosphere is higher than air pressure and the oxygen partial pressure in the atmosphere is higher than an oxygen partial pressure in air pressure.

(Crushing and Classification Steps)

After the oxygen-containing atmosphere heat treatment step after the pulverization step, the substance may be crushed as necessary.

In so doing, the crushing is preferably performed to an extent that the primary particles should not be broken.

Then, it is preferable to classify the substance after crushing.

<Surface Coating Treatment>

In order to coat the surface of the present core particles thus produced with the present amorphous compound containing Li, the A element, and O, for example, the present core particle powder may be added to a mixed solution obtained by dissolving the lithium raw material and the A element raw material in a solvent, and the resulting product may be dried and calcined under a predetermined condition as described above.

More specifically, it is preferable that the lithium raw material and the A element raw material, in both of which a ratio between the Li amount and the A element amount is adjusted within a predetermined range, are stirred and dissolved in a solvent, and then the present core particle powder is introduced therein.

Here, examples of the lithium raw material may include lithium alkoxide and lithium salt. Specifically, lithium ethoxide ($C_2H_5OLi$) and the like can be used as the lithium raw material. Examples of the A element raw material may include one having OH group at the terminal and one that becomes a hydroxide after being hydrolyzed. Specifically, pentaethoxy niobium ($Nb(C_2H_5O)_5$) and the like can be used as the A element raw material.

The solvent is not especially limited as long as being an organic solvent capable of dissolving the lithium raw material and the A element raw material. For example, ethanol and the like can be cited as the solvent. In addition, the solvent is preferably an anhydrous solvent.

In addition to the above, when a watersoluble raw material such as LiOH or $Li_2CO_3$ is used as the lithium raw material, or a watersoluble A element raw material is used, water can be used as the solvent.

Here, the ratio of the lithium raw material to the A element raw material is preferably adjusted such that the molar ratio (Li/A) of Li relative to the A element on the surface of the present positive electrode active substance, as obtained by XPS, is to be 0.5 to 3.5.

Further, in order to reduce the amount of lithium carbonate present on the surface of the positive electrode active substance, the calcination is preferably performed under, for example, an atmosphere not containing carbon dioxide such as an oxygen atmosphere.

In addition, when the calcination temperature is 400° C. or less, the compound that coats the surface of the present core particles can be amorphous. Thus, from such a viewpoint, the calcination temperature is preferably higher than 200° C. and 400° C. or less. Among others, it is more preferably higher than 250° C. or lower than 400° C., even more preferably higher than 300° C. or 350° C. or less.

<Application of Present Positive Electrode Active Substance>

The present positive electrode active substance can be suitably utilized as a positive electrode active substance for an all solid-state lithium secondary battery using a solid electrolyte after being crushed and classified as necessary.

In so doing, the present positive electrode active substance alone may be used as a positive electrode active substance for an all solid-state lithium secondary battery, or the present positive electrode active substance may be used by mixing with the other positive electrode active substance, for example, a positive electrode active substance composed of the present core particles or a positive electrode active substance composed of the other composition, such as $LiCoO_2$, $LiNiO_2$, $LiMn_2O_4$, $LiCo_{1/3}Ni_{1/3}Mn_{1/3}O_2$, $LiCo_{0.5}Ni_{0.5}O_2$, $LiNi_{0.7}Co_{0.2}Mn_{0.1}O_2$, $Li(Li_xMn_{2x}Co_{1-3x})O_2$ (where $0<x<1/3$), $LiFePO_4$, or $LiMn_{1-z}M_zPO_4$ (where $0<z\leq 0.1$ and M represents at least one metal element selected from the group consisting of Co, Ni, Fe, Mg, Zn, and Cu).

However, in the case of mixing with the other positive electrode active substance, the present positive electrode active substance is preferably mixed so as to occupy 50 wt % or more.

Examples of the shape of the all solid-state lithium secondary battery may include a laminate-type, a cylindrical-type, and a square-type.

For example, the all solid-state lithium secondary battery can be constituted by forming a layer composed of a solid electrolyte between the positive electrode and the negative electrode, and the all solid-state lithium secondary battery can be assembled even in a dry room or the like.

Examples of the solid electrolyte may include a compound represented by $Li_{7-x}PS_{6-x}$(Halogen)$_x$ (Halogen represents a group 17 element: a halogen element). Among others, a solid electrolyte containing sulfur, for example, a solid electrolyte composed of a compound containing lithium, phosphorus, sulfur, and halogen, and having a cubic argyrodite-type crystal structure, can be cited.

Examples of the negative electrode active substance may include a negative electrode active substance containing carbon such as artificial graphite, natural graphite, or non-graphitizing carbon (hard carbon). In addition, silicon or tin promising as a high capacity material can also be used as an active substance.

A lithium battery constituted in this manner can be used, for example, in electronic devices such as laptop computers, mobile phones, cordless telephone handsets, video movies, liquid crystal televisions, electric shavers, portable radios, headphone stereos, backup power supplies, and memory cards, medical devices such as pacemakers and hearing aids, and driving power supplies for being mounted in electric vehicles. Among others, the lithium battery is particularly effective as various kinds of portable computers such as mobile phones, PDAs (portable information terminals), and laptop computers, electric vehicles (including hybrid vehicles), and driving power supplies for electric power storage, which require excellent cycle characteristics.

Explanation of Terms

In the case of being expressed as the term "X to Y" (X and Y are arbitrary numbers) in the present description, unless otherwise stated, the term includes the meaning of "preferably more than X" or "preferably less than Y" along with the meaning "not less than X and not more than Y".

Further, in the case of being expressed as the term "X or more" (X is an arbitrary number) or the term "Y or less" (Y is an arbitrary number), the term also includes the intention of being "preferably more than X" or "preferably less than Y".

EXAMPLES

Next, the present invention will be described further based on Examples and Comparative Example. However, the present invention is not limited to the following Examples.

Example 1

Lithium carbonate having an average particle diameter (D50) of 7 μm, electrolytic manganese dioxide having an average particle diameter (D50) of 23 μm and a specific surface area of 40 m$^2$/g, nickel hydroxide having an average particle diameter (D50) of 22 μm, titanium oxide having an average particle diameter (D50) of 2 μm, and aluminum hydroxide having an average particle diameter (D50) of 3 μm were weighed respectively.

A polycarboxylic acid ammonium salt aqueous solution (SN Dispersant 5468, manufactured by San Nopco Ltd.) was added as a dispersant to ion-exchanged water. In so doing, an amount of the dispersant that was added was set to 6 wt % with respect to a total amount of the Li raw material, the Ni raw material, the Mn raw material, the Ti raw material, and the Al raw material, and the dispersant was sufficiently dissolved in and mixed with the ion-exchanged water. Then, the Ni, Mn, and Al raw materials that had been weighed were added to the ion-exchanged water in which the dispersant was dissolved in advance, and the resulting mixture was mixed and stirred, followed by pulverized using a wet-type pulverizer at 1,300 rpm for 120 minutes, thereby obtaining a pulverized slurry having an average particle diameter (D50) of 0.60 μm or less. Next, the remaining raw materials were added to the slurry, and the resulting mixture was stirred, followed by pulverized at 1,300 rpm for 120 minutes, thereby obtaining a pulverized slurry having an average particle diameter (D50) of 0.60 μm or less. A solid content concentration at this time was set to 40 wt %.

The pulverized slurry thus obtained was granulated and dried using a thermal spray drying machine (Spray Dryer "RL-10", manufactured by Ohkawara Kakohki Co., Ltd.). In so doing, a twin-jet nozzle was used for spraying, and the granulation and drying was performed under conditions where the spray pressure was set to 0.46 MPa, the slurry supply amount was set to 340 ml/min, and the temperature was adjusted such that an outlet temperature of a drying tower became 100 to 110° C.

The obtained granulated powder was calcined using a stationary electric furnace under an air atmosphere so as to maintain a temperature of 900° C. for 37 hours, and was then crushed using a crusher (Orient vertical-type pulverizing machine, manufactured by Orient Pulverizing Machine Co., Ltd.).

After the crushing, the crushed powder was subjected to a heat treatment (first heat treatment) using a stationary electric furnace under an air atmosphere so as to maintain a temperature of 750° C. for 37 hours, and was then crushed using a crusher (Orient vertical-type pulverizing machine, manufactured by Orient Pulverizing Machine Co., Ltd.).

After the crushing, the crushed powder was introduced into a plastic beaker (capacity of 5,000 mL) which was filled with 2,000 mL of ion-exchanged water having a pH of 6 to 7 and a temperature of 25° C., and the content was stirred using a stirrer (propeller area of 33 cm$^2$) at a rotation speed of 400 to 550 rpm for 20 minutes.

After stirring, the stirring was stopped, the stirrer was taken out from the water, and the resulting stirred product was left to stand for 10 minutes. Then, the supernatant was removed by decantation, the residual was collected as a precipitate by using a suction filtration machine (filter paper No. 131), and the precipitate thus collected was dried in an environment of 120° C. for 12 hours. Thereafter, the resulting product was dried for 7 hours in a state of being heated so as to have the product temperature of 500° C.

Then, after drying, the resulting dried product was crushed using a counter jet mill (pulverizing and classifying apparatus, manufactured by Hosokawa Micron Corp.) (crushing condition: rotation speed of classifier of 11,000 rpm). Thereafter, the resulting crushed product was classified using a sieve having an aperture of 53 µm.

Thereafter, the resulting classified product was subjected to a heat treatment (second heat treatment) while flowing oxygen at an oxygen supply amount of 0.5 L/min in a tubular stationary furnace so as to maintain a furnace set temperature of 725° C. for 5 hours.

The powder obtained after the second heat treatment was classified using a sieve having an aperture of 53 µm, and the powder under the sieve was collected to obtain a lithium manganese-containing composite oxide. The lithium manganese-containing composite oxide was identified as a spinel-type lithium manganese-containing composite oxide by XRD measurement as described later. Therefore, the lithium manganese-containing composite oxide is referred to as a spinel-type lithium manganese-containing composite oxide. The same applies to the following Examples and Comparative Example.

The spinel-type lithium manganese-containing composite oxide, that is, the core particles were chemically analyzed, and the results were Li: 4.1 wt %, Ni: 13.6 wt %, Mn: 41.7 wt %, Ti: 5.4 wt %, and Al: 0.01 wt %. From the cross-sectional SEM photograph of the primary particles, it was confirmed that the core particles were polycrystalline.

The composition when expressing by a general formula: [$Li_x(M1_yM2_zMn_{2-x-y-z})O_{4-\delta}$] (assuming $\delta=0$) is shown in Table 1. The M1 represents Ni in the present Example, and the substitution element species M2 represents Ti and Al in the present Example (the same applies to the following Examples and Comparative Example).

Here, the temperatures in the calcination and in the heat treatment are product temperatures of the treated object which are measured by bringing a thermocouple into contact with the treated object in the furnace. The same applies to the following Examples and Comparative Example.

Then, Nb was employed as the A element, lithium ethoxide was used as the lithium raw material, and pentaethoxy niobium was used as the Nb raw material.

Predetermined amounts of lithium ethoxide and pentaethoxy niobium were weighed, and these were added to ethanol and dissolved to prepare a sol-gel solution for coating. 5 g of the spinel-type lithium manganese-containing composite oxide powder was introduced into the sol-gel solution for coating, and subjected to ultrasonic irradiation while being heated at 60° C. for 30 minutes using a rotary evaporator to be hydrolyzed. Thereafter, the pressure was reduced over 30 minutes while maintaining 60° C. to remove the solvent. After removing the solvent, it was left to stand at room temperature for 16 hours and dried. Next, the resulting product was subjected to a heat treatment (third heat treatment) so as to maintain 350° C. for 5 hours in an air atmosphere using a box-type small electric furnace (manufactured by Koyo Thermo Systems Co., Ltd.), thereby obtaining a surface-coated spinel-type lithium manganese-containing composite oxide powder, that is, a positive electrode active substance (sample).

Example 2

A surface-coated spinel-type lithium manganese-containing composite oxide powder, that is, a positive electrode active substance (sample) was obtained in the same manner as in Example 1 except that the raw material ratio was changed, the Al raw material was not used, the calcination temperature was changed to 890° C., and the amounts of lithium ethoxide and pentaethoxy niobium were changed.

Here, the spinel-type lithium manganese-containing composite oxide powder, that is, the core particles were chemically analyzed, and the results were Li: 4.2 wt %, Ni: 13.2 wt %, Mn: 41.6 wt %, and Ti: 5.0 wt %. From the cross-sectional SEM photograph of the primary particles, it was confirmed that the core particles were polycrystalline.

Example 3

A surface-coated spinel-type lithium manganese-containing composite oxide powder, that is, a positive electrode active substance (sample) was obtained in the same manner as in Example 2 except that the raw material ratio was changed, the amounts of lithium ethoxide and pentaethoxy niobium were changed, and the third heat treatment temperature was changed to 330° C.

Here, the spinel-type lithium manganese-containing composite oxide powder, that is, the core particles were chemically analyzed, and the results were Li: 4.1 wt %, Ni: 13.1 wt %, Mn: 39.3 wt %, and Ti: 5.2 wt %. From the cross-sectional SEM photograph of the primary particles, it was confirmed that the core particles were polycrystalline.

Example 4

A surface-coated spinel-type lithium manganese-containing composite oxide powder, that is, a positive electrode active substance (sample) was obtained in the same manner as in Example 2 except that the raw material ratio was changed, and the amounts of lithium ethoxide and pentaethoxy niobium were changed.

Here, the spinel-type lithium manganese-containing composite oxide powder, that is, the core particles were chemically analyzed, and the results were Li: 4.1 wt %, Ni: 13.3 wt %, Mn: 42.7 wt %, and Ti: 5.1 wt %. From the cross-sectional SEM photograph of the primary particles, it was confirmed that the core particles were polycrystalline.

Example 5

A surface-coated spinel-type lithium manganese-containing composite oxide powder, that is, a positive electrode active substance (sample) was obtained in the same manner as in Example 1 except that the raw material ratio was changed, cobalt hydroxide was used as the Co raw material instead of the Al raw material, the calcination temperature was changed to 890° C., the amounts of lithium ethoxide and pentaethoxy niobium were changed, and the third heat treatment temperature was changed to 360° C.

Here, the spinel-type lithium manganese-containing composite oxide powder, that is, the core particles were chemically analyzed, and the results were Li: 4.1 wt %, Ni: 13.2 wt %, Mn: 42.3 wt %, Ti: 4.9 wt %, and Co: 0.09 wt %. From the cross-sectional SEM photograph of the primary particles, it was confirmed that the core particles were polycrystalline.

Example 6

A surface-coated spinel-type lithium manganese-containing composite oxide powder, that is, a positive electrode active substance (sample) was obtained in the same manner as in Example 1 except that the raw material ratio was changed, magnesium oxide was used as the Mg raw material instead of the Al raw material, the calcination temperature was changed to 890° C., the amounts of lithium ethoxide and pentaethoxy niobium were changed, and the third heat treatment temperature was changed to 370° C.

Here, the spinel-type lithium manganese-containing composite oxide powder, that is, the core particles were chemically analyzed, and the results were Li: 4.1 wt %, Ni: 13.2 wt %, Mn: 41.8 wt %, Ti: 5.2 wt %, and Mg: 0.002 wt %. From the cross-sectional SEM photograph of the primary particles, it was confirmed that the core particles were polycrystalline.

Example 7

A surface-coated spinel-type lithium manganese-containing composite oxide powder, that is, a positive electrode active substance (sample) was obtained in the same manner as in Example 2 except that the raw material ratio was changed, the calcination temperature was changed to 880° C., and the amounts of lithium ethoxide and pentaethoxy niobium were changed.

Here, the spinel-type lithium manganese-containing composite oxide powder, that is, the core particles were chemically analyzed, and the results were Li: 4.1 wt %, Ni: 13.3 wt %, Mn: 39.4 wt %, and Ti: 5.2 wt %. From the cross-sectional SEM photograph of the primary particles, it was confirmed that the core particles were polycrystalline.

Example 8

Lithium carbonate having an average particle diameter (D50) of 7 μm, electrolytic manganese dioxide having an average particle diameter (D50) of 23 μm and a specific surface area of 40 m²/g, nickel hydroxide having an average particle diameter (D50) of 22 μm, titanium oxide having an average particle diameter (D50) of 2 μm, and lithium tetraborate having an average particle diameter (D50) of 60 μm were weighed respectively.

A polycarboxylic acid ammonium salt aqueous solution (SN Dispersant 5468, manufactured by San Nopco Ltd.) was added as a dispersant to ion-exchanged water. In so doing, an amount of the dispersant that was added was set to 6 wt % with respect to a total amount of the Li raw material, the Ni raw material, the Mn raw material, the Ti raw material, and the B raw material, and the dispersant was sufficiently dissolved in and mixed with the ion-exchanged water. Then, the Ni and Mn raw materials that had been weighed were added to the ion-exchanged water in which the dispersant was dissolved in advance, and the resulting mixture was mixed and stirred, followed by pulverized using a wet-type pulverizer at 1,300 rpm for 120 minutes, thereby obtaining a pulverized slurry having an average particle diameter (D50) of 0.60 μm or less. Next, the remaining raw materials were added to the slurry, and the resulting mixture was stirred, followed by pulverized at 1,300 rpm for 120 minutes, thereby obtaining a pulverized slurry having an average particle diameter (D50) of 0.60 μm or less. A solid content concentration at this time was set to 40 wt %.

The pulverized slurry thus obtained was granulated and dried using a thermal spray drying machine (Spray Dryer "RL-10", manufactured by Ohkawara Kakohki Co., Ltd.). In so doing, a twin-jet nozzle was used for spraying, and the granulation and drying was performed under conditions where the spray pressure was set to 0.46 MPa, the slurry supply amount was set to 340 ml/min, and the temperature was adjusted such that an outlet temperature of a drying tower became 100 to 110° C.

The obtained granulated powder was calcined using a stationary electric furnace under an air atmosphere so as to maintain a temperature of 880° C. for 37 hours, and was then crushed using a crusher (Orient vertical-type pulverizing machine, manufactured by Orient Pulverizing Machine Co., Ltd.).

After the crushing, the crushed powder was subjected to a heat treatment (first heat treatment) using a stationary electric furnace under an air atmosphere so as to maintain a temperature of 750° C. for 37 hours, and was then crushed using a crusher (Orient vertical-type pulverizing machine, manufactured by Orient Pulverizing Machine Co., Ltd.).

After the crushing, the crushed powder was introduced into a plastic beaker (capacity of 5,000 mL) which was filled with 2,000 mL of ion-exchanged water having a pH of 6 to 7 and a temperature of 25° C., and the content was stirred using a stirrer (propeller area of 33 cm²) at a rotation speed of 400 to 550 rpm for 20 minutes. After stirring, the stirring was stopped, the stirrer was taken out from the water, and the resulting stirred product was left to stand for 10 minutes. Then, the supernatant was removed by decantation, the residual was collected as a precipitate by using a suction filtration machine (filter paper No. 131), and the precipitate thus collected was dried in an environment of 120° C. for 12 hours. Thereafter, the resulting product was dried for 7 hours in a state of being heated so as to have the product temperature of 500° C.

Then, after drying, the resulting dried product was crushed using a counter jet mill (pulverizing and classifying apparatus, manufactured by Hosokawa Micron Corp.) (crushing condition: rotation speed of classifier of 11,000 rpm). Thereafter, the resulting crushed product was classified using a sieve having an aperture of 53 μm.

Thereafter, the resulting classified product was subjected to a heat treatment (second heat treatment) while flowing oxygen at an oxygen supply amount of 0.5 L/min in a tubular stationary furnace so as to maintain a furnace set temperature of 725° C. for 5 hours.

The powder obtained after the second heat treatment was classified using a sieve having an aperture of 53 μm, and the powder under the sieve was collected to obtain a spinel-type lithium manganese-containing composite oxide powder.

The spinel-type lithium manganese-containing composite oxide, that is, the core particles were chemically analyzed, and the results were Li: 3.9 wt %, Ni: 14.2 wt %, Mn: 42.6 wt %, Ti: 3.6 wt %, and B: 0.1 wt %. From the cross-sectional SEM photograph of the primary particles, it was confirmed that the core particles were polycrystalline.

Then, Nb was employed as the A element, lithium ethoxide was used as the lithium raw material, and pentaethoxy niobium was used as the Nb raw material. Predetermined amounts of lithium ethoxide and pentaethoxy niobium were weighed, and these were added to ethanol and dissolved to prepare a sol-gel solution for coating.

5 g of the spinel-type lithium manganese-containing composite oxide powder was introduced into the sol-gel solution for coating, and subjected to ultrasonic irradiation while being heated at 60° C. for 30 minutes using a rotary evaporator to be hydrolyzed. Thereafter, the pressure was reduced over 30 minutes while maintaining 60° C. to remove the solvent. After removing the solvent, it was left to stand at room temperature for 16 hours and dried. Next, the resulting product was subjected to a heat treatment (third heat treatment) so as to maintain 340° C. for 5 hours in an air atmosphere using a box-type small electric furnace (manufactured by Koyo Thermo Systems Co., Ltd.), thereby obtaining a surface-coated spinel-type lithium manganese-containing composite oxide powder, that is, a positive electrode active substance (sample).

Comparative Example 1

Lithium carbonate having an average particle diameter (D50) of 7 μm, electrolytic manganese dioxide having an average particle diameter (D50) of 23 μm and a specific surface area of 40 m$^2$/g, and nickel hydroxide having an average particle diameter (D50) of 22 μm were weighed respectively.

A polycarboxylic acid ammonium salt aqueous solution (SN Dispersant 5468, manufactured by San Nopco Ltd.) was added as a dispersant to ion-exchanged water. In so doing, an amount of the dispersant that was added was set to 6 wt % with respect to a total amount of the Li raw material, the Ni raw material, and the Mn raw material, and the dispersant was sufficiently dissolved in and mixed with the ion-exchanged water. Then, the raw materials that had been weighed were added to the ion-exchanged water in which the dispersant was dissolved in advance, and the resulting mixture was mixed and stirred to prepare a slurry having a solid content concentration of 40 wt %.

The slurry was pulverized using a wet-type pulverizer at 1,300 rpm for 120 minutes to have an average particle diameter (D50) of 0.60 μm or less.

The pulverized slurry thus obtained was granulated and dried using a thermal spray drying machine (Spray Dryer "RL-10", manufactured by Ohkawara Kakohki Co., Ltd.). In so doing, a twin-jet nozzle was used for spraying, and the granulation and drying was performed under conditions where the spray pressure was set to 0.19 MPa, the slurry supply amount was set to 350 ml/min, and the temperature was adjusted such that an outlet temperature of a drying tower became 100 to 110° C.

The obtained granulated powder was calcined, using a stationary electric furnace, so as to maintain a temperature of 950° C. for 37 hours under an atmosphere where the oxygen partial pressure was 0.021 MPa, and then heat treated so as to maintain a temperature of 750° C. for 37 hours under an atmosphere where the oxygen partial pressure was 0.021 MPa.

The calcined powder obtained by the heat treatment was classified using a sieve having an aperture of 53 μm, and the powder under the sieve was collected to obtain a spinel-type lithium manganese-containing composite oxide powder, that is, a positive electrode active substance (sample).

The spinel-type lithium manganese-containing composite oxide powder thus obtained was chemically analyzed, and the results were Li: 3.9 wt %, Ni: 16.0 wt %, and Mn: 43.0 wt %.

<Method for Measuring Various Physical Property Values>

Various physical property values of the spinel-type lithium manganese-containing composite oxide, that is, the positive electrode active substance (sample) obtained in each of Examples and Comparative Example were measured as follows.

(Chemical Analysis)

As for the spinel-type lithium manganese-containing composite oxide, that is, the positive electrode active substance (sample) obtained in each of Examples and Comparative Example, the content of the respective elements was measured by inductively coupled plasma (ICP) emission spectroscopy.

(Mode Diameter, D50, D10, and Dmin)

As for the sample obtained in each of Examples and Comparative Example, the sample (powder) was introduced into a watersoluble solvent using an automatic sample feeder for laser diffraction particle diameter distribution measuring apparatus ("Microtorac SDC", manufactured by MicrotoracBEL Corp.), and the sample was irradiated with ultrasonic waves of 40 W for 360 seconds at a flow rate of 40% more than once. Subsequently, the particle size distribution was measured using a laser diffraction particle size distribution measuring apparatus "MT3000II" manufactured by MicrotoracBEL Corp., and values of mode diameter, D50, D10, and Dmin were measured from a chart of the volume-based particle size distribution thus obtained.

The number of irradiation times of ultrasonic waves was a number of times until a change rate of D50 before and after the ultrasonic waves irradiation became 8% or less.

Here, at the time of measurement, the watersoluble solvent was filtered through a filter having a pore size of 60 μm, and the average value obtained by performing two measurements under the conditions of a solvent refractive index of 1.33, penetration for the particle penetrability conditions, a particle refractive index of 2.46, a non-spherical shape, a measurement range of 0.133 to 704.0 μm, and a measurement time of 30 seconds, was defined as respective values.

(Average Primary Particle Diameter)

An average primary particle diameter of the spinel-type lithium manganese-containing composite oxide, that is, the positive electrode active substance (sample) obtained in each of Examples and Comparative Example was measured as follows.

The sample (powder) was observed using a SEM (scanning electron microscope) at a magnification of 1,000 times, and particles having a size corresponding to D50 were selected. Next, the sample (powder) was photographed by changing a magnification from 2,000 to 10,000 times in accordance with D50. An image which is suitable for obtaining an average primary particle diameter by using image analysis software described later can be photographed by setting a photographing magnification to, for example, 10,000 times when the D50 is about 7 μm, 5,000 times when the D50 is about 15 μm, and 2,000 times when the D50 is about 22 μm.

With the photographed image, the average primary particle diameter of the selected particles was obtained using image analysis software (MAC-VIEW ver. 4, manufactured by Mountech Co., Ltd.). Here, the average primary particle diameter means a 50% accumulated particle diameter in a volume distribution (Heywood diameter: equivalent circle diameter).

In order to calculate the average primary particle diameter, it is preferable to measure 30 pieces or more of the primary particles and to calculate the average value. When the number of the measurement particles was insufficient, the measurement was performed by additionally selecting the particles having a size equivalent to D50 and photographing so that the number of the primary particles became 30 pieces or more in total.

(Identification of Crystal Structure)

As for the spinel-type lithium manganese-containing composite oxide obtained in each of Examples and Comparative Example, the crystal structure was identified using an XRD apparatus as follows.

The XRD measurement was performed under the following measurement conditions 1 using an XRD measurement apparatus (apparatus name "Ultima IV", manufactured by Rigaku Corp.) to obtain an XRD pattern. The obtained XRD pattern was analyzed using an integrated X-ray powder diffraction software PDXL (manufactured by Rigaku Corp.) to determine a crystal phase information.

Here, on the assumption that, in the crystal phase information, the crystal structure is attributed to a cubic crystal of a space group Fd-3m (Origin Choice 2), and the 8a site is occupied by Li, the 16d site is occupied by Mn, the M1 element, the M2 element, and an excessive Li content a, and the 32e site is occupied by O, a seat occupancy and an atomic displacement parameter B on each site were fixed to 1, and the calculation was repeatedly performed until Rwp and S which represent the degree of coincidence of an observed intensity with a calculated intensity converged.

The observed intensity and the calculated intensity are sufficiently coincident, which means that the obtained sample is not limited to the space group, and there is a high reliability for the obtained sample to have a spinel-type crystal structure.

=XRD Measurement Conditions 1=

X-ray source: CuKα (line focus), wavelength: 1.541836 Å

Operation axis: 2θ/θ, measurement method: continuous, counting unit: cps

Initiation angle: 15.0°, termination angle: 120.0°, number of integration times: 1 time Sampling width: 0.01°, scanning speed: 1.0°/min Voltage: 40 kV, current: 40 mA Divergence slit: 0.2 mm, divergence vertical restriction slit: 10 mm Scattering slit: opening, light-receiving slit: opening Offset angle: 0°

Goniometer radius: 285 mm, optical system: focusing method

Attachment: ASC-48

Slit: slit for D/teX Ultra

Detector: D/teX Ultra

Incident-monochro: CBO

Ni-Kβ filter: None

Speed of revolution: 50 rpm (Crystallite Size and Strain)

The measurement of an X-ray diffraction pattern for obtaining a crystallite size was performed under the following measurement conditions 2 using an X-ray diffractometer (D8 ADVANCE, manufactured by Bruker AXS K.K.) using Cu-Kα rays.

Peaks in the X-ray diffraction pattern obtained in a range of diffraction angle 2θ=10 to 120° were analyzed using analysis software (product name "Topas Version 3") to obtain a crystallite size and a strain of the sample.

Here, on the assumption that the crystal structure is attributed to a cubic crystal of a space group Fd-3m (Origin Choice 2), and Li is present at the 8a site, Mn, the M1 element, the M2 element, and an excessive Li content a are present at the 16d site, and the 32e site is occupied by O, a parameter Beq. was fixed to 1, a fraction coordinate and a seat occupancy of O in the 32e site was set as a variable, and the calculation was repeatedly performed until the indices Rwp and GOF, which represent the degree of coincidence of an observed intensity with a calculated intensity, converged to Rwp<10.0 and GOF<2.8 as a guide. The crystallite size and the strain were analyzed using Gauss function to obtain the crystallite size and the strain.

=XRD Measurement Conditions 2=

Ray source: CuKα, operation axis: 2θ/θ, measurement method: continuous, counting unit: cps Initiation angle: 10°, termination angle: 120°

Detector: PSD

Detector Type: VANTEC-1

High Voltage: 5,585 V

Discr. Lower Level: 0.25 V

Discr. Window Width: 0.15 V

Grid Lower Level: 0.075 V

Grid Window Width: 0.524 V

Flood Field Correction: Disabled

Primary radius: 250 mm

Secondary radius: 250 mm

Receiving slit width: 0.1436626 mm

Divergence slit: 0.5°

Filament Length: 12 mm

Sample Length: 25 mm

Receiving Slit Length: 12 mm

Primary Sollers: 2.623°

Secondary Sollers: 2.623°

Lorentzian, 1/Cos: 0.004933548 Th

Voltage: 40 kV, current: 35 mA (Specific Surface Area)

A specific surface area (SSA) of the sample obtained in each of Examples and Comparative Example was measured as follows.

First, 2.0 g of the sample (powder) was weighed in a glass cell (standard cell) for an automatic specific surface area analyzer, Macsorb (manufactured by Mountech Co., Ltd.), and was set in an auto sampler. The inside of the glass cell was replaced by a nitrogen gas, and then a heat treatment was performed at 250° C. for 15 minutes in the nitrogen gas atmosphere. Thereafter, it was cooled for 4 minutes while allowing a mixed gas of nitrogen and helium to flow. After cooling, the sample (powder) was measured by a BET one-point method.

Here, as the adsorption gas in the cooling and measurement, a mixed gas of 30% of nitrogen and 70% of helium was used.

<Surface Analysis by XPS>

The particle surface of the sample obtained in each of Examples and Comparative Example was analyzed using a QUANTUM 2000 that was an XPS apparatus manufactured by Ulvac-Phi, Inc. The conditions used for the measurement were as follows.

Excitation X-rays: AlKα (1,486.6 eV)

Tube voltage: 20 kV

Tube current: 5.0 mA

X-ray irradiation area: 100 μmϕ

Measurement conditions: state and semi-quantitative narrow measurement

Pass energy: 23.5 eV

Measurement interval: 0.1 eV

The XPS data was analyzed using data analysis software ("Multipack Ver. 6.1A", manufactured by Ulvac-Phi, Inc.). The orbit to be used for the calculation was determined for each element as described below, and the analysis was then performed.

Li: 1s

Ni: 2p3

Nb: 3d

Mn: 2p1

Ti: 2p3

C: 1s

O: 1s

The element ratio calculated in the above was confirmed by taking into consideration the interference of the LMM peak of Ni and comparing with the compositional ratio of the above-mentioned chemical analysis result.

More specifically, in regard to the sample obtained in each of Examples and Comparative Example, the surface of the sample particles was analyzed under the aforementioned conditions by using XPS, and the ratio (Li/Nb) of the peak intensity of the peak of Li relative to the peak intensity of the peak of Nb was determined from the obtained X-ray photoelectron spectroscopic spectrum.

Here, by using XPS, the elemental component in the depth to about 5 nm from the particle surface can be quantitatively analyzed.

<Observation of Halo Pattern by Selected Area Electron Diffraction>

Figure 2:
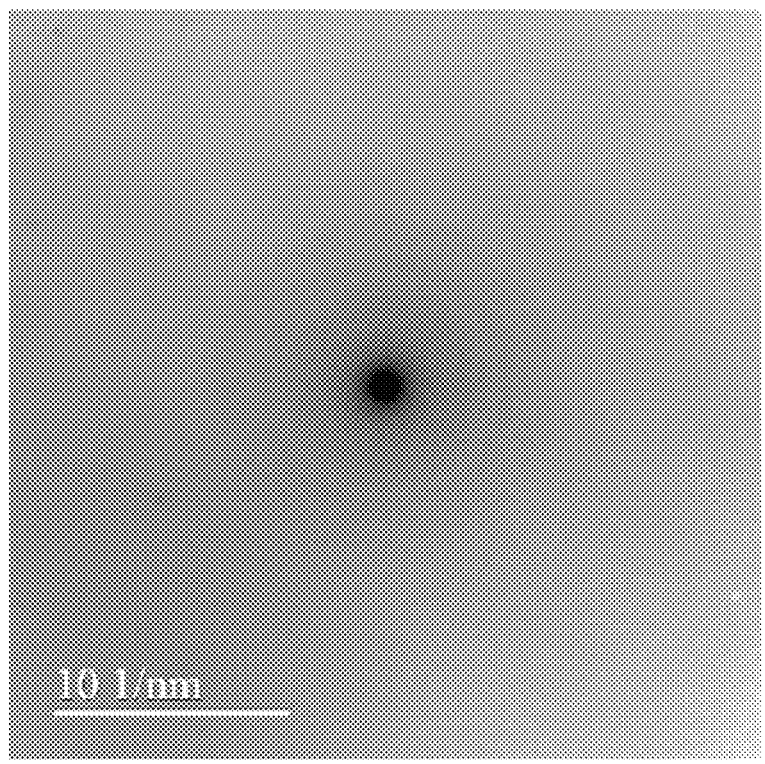
FIG. 2 shows an observation of a halo pattern obtained by selected area electron diffraction in regard to the positive electrode active substance (sample) obtained in Example 2.

An electron diffraction was acquired from an area of about 100 nm in diameter under the conditions of an acceleration voltage of 200 kV and a selected area aperture size of 10 μm by using a transmission electron microscope (JEM-ARM200F, manufactured by JEOL Ltd.) to thereby observe the presence or absence of a halo pattern as shown in FIG. 2.

When the halo pattern can be observed, it can be confirmed that the compound present on the surface of the sample obtained in each of Examples and Comparative Example is an amorphous compound.

Here, the scale bar shown in FIG. 2 is a scale bar in the reciprocal lattice space.

(Amount of Carbonate Ions: Amount of $CO_3^{2-}$)

0.48 g of the sample obtained in each of Examples and Comparative Example was introduced into 48 ml of pure water and stirred for 5 minutes, and the resulting liquid was then filtered. Ion chromatography measurement was performed on the liquid from which lithium carbonate was extracted as described above to determine an amount of $CO_3^{2-}$ ions.

Here, the measurement was performed at 35° C. by using a Dionex ICS-2000 manufactured by Thermo Fisher Scientific K.K. as a measurement apparatus, a Dionex IonPac AS17-C as a column, and a potassium hydroxide as a carrier liquid (eluent).

The amount of carbonate ions (amount of $CO_3^{2-}$) (wt %) contained in the sample is shown in Table 1.

<Production and Evaluation of All Solid-State Lithium Secondary Battery>

A positive electrode mixture was prepared using the sample obtained in each of Examples and Comparative Example and a solid electrolyte to produce an all solid-state lithium secondary battery (all solid Gr/5 V-class positive electrode active substance cell), and the battery characteristics were then evaluated (evaluations of rate characteristics and cycle characteristics).

(Material)

The sample produced in each of Examples and Comparative Example was used as a positive electrode active substance, a graphite (Gr) powder was used as a negative electrode active substance, and a powder represented by a compositional formula: $Li_{5.8}PS_{4.8}Cl_{1.2}$ was used as a solid electrolyte powder.

The positive electrode mixture powder was prepared by mixing the positive electrode active substance (sample) produced in each of Examples and Comparative Example, the solid electrolyte powder, and a conductive material (acetylene black) powder in a ratio of 60:30:10 by using a mortar.

The negative electrode mixture powder was prepared by mixing the graphite (Gr) powder and the solid electrolyte powder in a ratio of 50:50 by using a mortar.

(Production of All Solid-State Lithium Secondary Battery)

13 mg of the positive electrode mixture powder (sample) was filled in an insulated tube (ϕ9 mm) for sealed-type cell, and was uniaxially molded at 368 MPa to produce a positive electrode mixture powder pellet. The obtained positive electrode mixture powder pellet was moved into an insulated tube (ϕ10.5 mm) for sealed-type cell, and 50 mg of the solid electrolyte powder was filled onto the positive electrode mixture powder pellet.

Next, the solid electrolyte powder was uniaxially molded at 184 MPa along with the positive electrode mixture powder pellet. Further, 10 mg of the negative electrode mixture powder was filled onto the solid electrolyte, and was uniaxially molded at 551 MPa. Then, they were fastened with pressuring screws to produce an all solid-state lithium secondary battery.

(Evaluation of Battery Characteristics)

The battery characteristics were evaluated after introducing the all solid-state lithium secondary battery cell into an environmental tester maintained at 25° C. and connecting with a charge-discharge measurement apparatus. At this time, the charging was performed in a CC-CV mode at the upper limit voltage of 5.0 V, and the discharging was performed in a CC mode at the lower limit voltage of 3.0 V.

The charging and the discharging were repeated at the current density of 0.1 C for the first cycle to the third cycle. At the 4th cycle, the charging was performed at the current density of 0.2 C, and the discharging was performed at the current density of 2.0 C. Then, for the 5th cycle to the 51st cycle, the charging and the discharging were repeated at the current density of 0.1 C.

Here, the discharge capacity at the third cycle is shown in Table 1 as "3rd discharge capacity".

In addition, based on the discharge curve at the third cycle, when the initial stage of discharge is expressed as DOD 0% and the final stage of discharge is expressed as DOD 100%, the average value of the voltage in the discharge period from DOD 0% to DOD 50% is shown in Table 1 as "operating potential (DOD 0% to 50%)".

The value of "rate characteristics (2 C/0.1 C)" is expressed by a quotient obtained by dividing a discharge capacity at the 4th cycle by a discharge capacity at the second cycle. The result is shown in Table 1 as a relative value when the value in Example 3 is set to 100.

The value of "operating potential retention rate (2 C/0.1 C)" is expressed by a quotient obtained by calculating the average value of the voltage in the discharge period from DOD 0% to DOD 50% at the time of the fourth cycle discharge and dividing the average value by the operating potential (DOD 0% to 50%) at the third cycle. The result is shown in Table 1 as a relative value when the value in Example 5 is set to 100.

The value of "capacity retention rate index" is expressed by a quotient obtained by dividing a discharge capacity at the 51st cycle by a discharge capacity at the second cycle, and the result is shown in Table 1 as a relative value when the value in Comparative Example 1 is set to 100.

TABLE 1

|  |  | Example 1 | Example 2 | Example 3 | Example 4 | Example 5 | Example 6 | Example 7 | Example 18 | Comparative Example 1 |
|---|---|---|---|---|---|---|---|---|---|---|
| Li | x | 1.04 | 0.7 | 1.08 | 1.04 | 1.05 | 1.05 | 1.05 | 1.04 | 1.01 |
| M1 | y | 0.41 | 0.39 | 0.41 | 0.40 | 0.40 | 0.38 | 0.42 | 0.44 | 0.51 |
| Mn | 3-x-y-z | 1.35 | 1.35 | 1.31 | 1.37 | 1.37 | 1.36 | 1.32 | 1.32 | 1.48 |
|  | y-z |  |  |  |  |  |  |  |  |  |
| M2 | z | 0.20 | 0.19 | 0.20 | 0.19 | 0.18 | 0.20 | 0.20 | 0.20 | 0.00 |
| Element Species M1 | — | Ni | Ni | Ni | Ni | Ni | Ni | Ni | Ni | Ni |
| Substitution Element Species M2 | — | — | Ti, Al | Ti | Ti | Ti | Ti, Co | Ti, Mg | Ti | Ti | — |
| Secondary Particle Diameter (D50) | μm | 4.64 | 4.63 | 4.55 | 4.98 | 4.45 | 4.77 | 3.89 | 4.95 | 17.26 |
| (\|mode diameter − D50\|/mode diameter * 100) | % | 0.22 | 8.1 | 1.7 | 1.2 | 5.0 | 5.4 | 0.26 | 10.0 | 6.7 |
| \|mode diameter − D10\|/mode diameter * 100 | % | 38 | 45 | 43 | 43 | 39 | 38 | 38 | 47 | 56 |
| Average Primary Particle Diameter/D50 | — | 0.36 | 0.27 | 0.24 | 0.25 | 0.28 | 0.28 | 0.24 | 0.55 | 0.30 |
| Crystallite Size | nm | 155 | 145 | 134 | 144 | 138 | 144 | 124 | 152 | 215 |
| Crystallite Size/Average Primary Particle Diameter | — | 0.08 | 0.12 | 0.12 | 0.12 | 0.11 | 0.11 | 0.13 | 0.06 | 0.04 |
| Mode Diameter | μm | 4.63 | 5.04 | 4.63 | 5.04 | 4.24 | 5.04 | 3.88 | 5.50 | 18.50 |
| Average Primary Particle Diameter | μm | 1.66 | 1.25 | 1.08 | 1.23 | 1.25 | 1.34 | 0.84 | 2.70 | 5.19 |
| Dmin | μm | 1.78 | 1.50 | 1.50 | 1.06 | 1.26 | 1.50 | 1.26 | 1.26 | 3.00 |
| Stain | — | 0.04 | 0.06 | 0.08 | 0.06 | 0.07 | 0.06 | 0.09 | 0.08 | 0.00 |
| D10 | μm | 2.89 | 2.78 | 2.66 | 2.85 | 2.58 | 3.14 | 2.42 | 2.81 | 8.22 |
| Specific Surface Area | m$^2$/g | 2.3 | 2.7 | 3.0 | 2.7 | 3.0 | 2.2 | 3.0 | 4.0 | 0.2 |
| Presence or Absence of Halc Pattern | — | present | present | present | present | present | present | present | present | — |
| Li/Nb (Analysis by XP3) | — | 1.58 | 2.01 | 2.90 | 2.88 | 0.80 | 1.20 | 1.01 | 1.01 | — |
| Amount of CO$_3{}^{2-}$ | % | 0.1 | 0.4 | 1.5 | 0.5 | 0.2 | 0.1 | 0.3 | 0.5 | 0.0 |
| 3rd Discharge Capacity | mAh/g | 124 | 124 | 121 | 103 | 105 | 113 | 118 | 107 | 1.3 |
| Operating Potential (DOD 0% to 50%) | V | 4.6 | 4.7 | 4.6 | 4.6 | 4.5 | 4.5 | 4.6 | 4.5 | 3.5 |
| Rate Characteristics (2C/0.1C) | — | 116 | 116 | 100 | 112 | 106 | 130 | 158 | 146 | — |
| Operating Potential Retention Rate (2C/0.1C) | — | 104 | 103 | 106 | 107 | 100 | 105 | 109 | 104 | — |
| Capacity Retention Rate Index | — | 181 | 182 | 141 | 179 | 191 | 180 | 197 | 198 | 100 |

(Consideration)

In any of Examples 1 to 8, from the results of XRD measurements, an analysis result in which the obtained lithium manganese-containing composite oxide was a 5 V-class spinel which was fitted to a crystal structure model of a cubic crystal of a space group Fd-3m (Origin Choice 2), wherein Rwp and S which represented the degree of coincidence of an observed intensity with a calculated intensity were Rwp<10 or S<2.5, was obtained. In addition, from the results of the battery performance evaluation tests, it is confirmed that the obtained lithium manganese-containing composite oxide had an operating potential of 4.5 V or more at a metal Li reference potential.

Further, since the ratio of crystallite size/average primary particle diameter was less than 1, it is confirmed that the primary particles were composed of a polycrystal in the present core particles of the positive electrode active substance (sample) in any of Examples 1 to 8.

From the results of Examples described above and the results of the tests which have been so far conducted, by having a structure in which the surface of the present core particles composed of the spinel-type composite oxide containing Li, Mn, O, and two or more elements other than these is coated with the amorphous compound containing Li, A (A represents one element or a combination of two or more elements selected from the group consisting of Ti, Zr, Ta, Nb, Zn, W, and Al), and O; having the primary particles of the present core particles composed of a polycrystal; having a D50 in the volume-based particle size distribution measurement of 0.5 to 9 μm; specifying the relationship among the mode diameter, D50, and D10; and specifying the relationship between the average primary particle diameter and D50, the dispersibility of the primary particles can be enhanced, and further, by making the particle size distribution close to the normal distribution and sharp, the operating voltage during discharge can be maintained high, and the rate characteristics and the cycle characteristics can be effectively improved. It can be considered that this is made as a result of achieving both the lithium ion conductivity improvement and the resistance suppression and reducing the contact resistance between the positive electrode active substance and the solid electrolyte.

From such a view point, in regard to the positive electrode active substance having a structure in which the surface of the present core particles containing at least Li, Mn, 0, and two or more elements other than these is coated with the amorphous compound containing Li, A (A represents one element or a combination of two or more elements selected from the group consisting of Ti, Zr, Ta, Nb, Zn, W, and Al), and O; and having an operating potential of 4.5 V or more at a metal Li reference potential, it is found that the D50 according to a measurement of a volume-based particle size distribution obtained via measurements by a laser diffraction scattering-type particle size distribution measurement method is preferably 0.5 to 9 μm, the percentage of the ratio of the absolute value of the difference between the mode diameter and the D50 relative to the mode diameter ((|mode diameter−D50|/mode diameter)×100) is preferably 0 to 25%, and the percentage of the ratio of the absolute value of the difference between the mode diameter and the D10 relative to the mode diameter ((|mode diameter−D10|/mode diameter)×100) is preferably 20 to 58%.

It is also found that the ratio of average primary particle diameter/D50, which is calculated from the average primary particle diameter calculated from the SEM image and the D50, is preferably 0.20 to 0.99.

As for the structure where the LiAO compound is present on the surface of the present core particles in the above Examples, only Nb is used as the A element in Examples, but Nb and Ti, Zr, Ta, Zn, W, and Al are common in that they are valve metals, and it can be considered that the same effect can be obtained.

The invention claimed is:

1. A positive electrode active substance for an all solid-state lithium secondary battery, having an operating potential of 4.5 V or more at a metal Li reference potential, wherein a surface of present core particles composed of a spinel-type lithium manganese-containing composite oxide containing at least Li, Mn, O, and two or more elements other than Li, Mn, and O is coated with an amorphous compound containing Li, A, and O, where A represents one element or a combination of two or more elements selected from the group consisting of Ti, Zr, Ta, Nb, Zn, W, and Al; and primary particles of the present core particles are composed of a polycrystal;
wherein, with regard to a D50, a mode diameter, and a D10 of the positive electrode active substance according to a measurement of a volume-based particle size distribution obtained via measurements by a laser diffraction scattering-type particle size distribution measurement method, the D50 is 0.5 to 9 μm, a percentage of a ratio of the absolute value of the difference between the mode diameter and the D50 relative to the mode diameter, (|mode diameter−D50|/mode diameter)×100, is 0 to 25%, a percentage of a ratio of the absolute value of the difference between the mode diameter and the D10 relative to the mode diameter, (|mode diameter−D10|/mode diameter)×100, is 20 to 58%;
wherein a ratio, average primary particle, diameter/D50 of an average primary particle diameter of the positive electrode active substance, which is calculated from a scanning-type electron microscope (SEM) image obtained by a scanning-type electron microscope (SEM), relative to the D50 is 0.20 to 0.99;
wherein said amorphous compound contains Li in excess of 1 mol relative to 1 mol of the A element; and
wherein an amount of carbonate ions present on the surface of the positive electrode active substance is less than 2.5 wt % relative to the positive electrode active substance.

2. The positive electrode active substance for an all solid-state lithium secondary battery according to claim 1, wherein the molar ratio, Li/A, of Li relative to the A element in the positive electrode active substance surface, as obtained by X-ray photoelectron spectroscopy (XPS), is 0.5 to 3.5.

3. The positive electrode active substance for an all solid-state lithium secondary battery according claim 2, wherein the spinel-type lithium manganese-containing composite oxide is represented by a general formula [$Li_x(M1_yM2_zMn_{2-x-y-z})O_{4-\delta}$], wherein $1.00 \leq x \leq 1.20$, $0.20 \leq y \leq 1.20$, $0 < z \leq 0.5$, $0 \leq \delta \leq 0.2$, M1 represents one element or a combination of two or more elements selected from the group consisting of Ni, Co, and Fe, and M2 represents one element or a combination of two or more elements selected from the group consisting of Na, Mg, Al, P, K, Ca, Ti, V, Cr, Cu, Ga, Y, Zr, Nb, Mo, In, Ta, W, Re, and Ce.

4. The positive electrode active substance for an all solid-state lithium secondary battery according to claim 2, wherein the spinel-type lithium manganese-containing composite oxide is represented by a general formula [$Li_x(Ni_yM_zMn_{2-x-y-z})O_{4-\delta}$], wherein $1.00 \leq x \leq 1.20$, $0.20 \leq y \leq 0.70$, $0 < z \leq 0.5$, $0 \leq \delta \leq 0.2$, and M represents one element or a combination of two or more elements selected from the group consisting of Na, Mg, Al, P, K, Ca, Ti, V, Cr, Fe, Co, Cu, Ga, Y, Zr, Nb, Mo, In, Ta, W, Re, and Ce.

5. The positive electrode active substance for an all solid-state lithium secondary battery according to claim 2, wherein the mode diameter according to a measurement of a volume-based particle size distribution obtained via measurements by a laser diffraction scattering-type particle size distribution measurement method is 0.4 to 11 μm.

6. The positive electrode active substance for an all solid-state lithium secondary battery according to claim 1, wherein the spinel-type lithium manganese-containing composite oxide is represented by a general formula [$Li_x(M1_yM2_zMn_{2-x-y-z})O_{4-\delta}$], wherein $1.00 \leq x \leq 1.20$, $0.20 \leq y \leq 1.20$, $0 < z \leq 0.5$, $0 \leq \delta \leq 0.2$, M1 represents one element or a combination of two or more elements selected from the group consisting of Ni, Co, and Fe, and M2 represents one element or a combination of two or more elements selected from the group consisting of Na, Mg, Al, P, K, Ca, Ti, V, Cr, Cu, Ga, Y, Zr, Nb, Mo, In, Ta, W, Re, and Ce.

7. The positive electrode active substance for an all solid-state lithium secondary battery according to claim 6, wherein the mode diameter according to a measurement of a volume-based particle size distribution obtained via measurements by a laser diffraction scattering-type particle size distribution measurement method is 0.4 to 11 μm.

8. The positive electrode active substance for an all solid-state lithium secondary battery according to claim 1, wherein the spinel-type lithium manganese-containing composite oxide is represented by a general formula [$Li_x(Ni_yM_zMn_{2-x-y-z})O_{4-\delta}$], wherein $1.00 \leq x \leq 1.20$, $0.20 \leq y \leq 0.70$, $0 < z \leq 0.5$, $0 \leq \delta \leq 0.2$, and M represents one element or a combination of two or more elements selected from the group consisting of Na, Mg, Al, P, K, Ca, Ti, V, Cr, Fe, Co, Cu, Ga, Y, Zr, Nb, Mo, In, Ta, W, Re, and Ce.

9. The positive electrode active substance for an all solid-state lithium secondary battery according to claim 8, wherein the mode diameter according to a measurement of a volume-based particle size distribution obtained via measurements by a laser diffraction scattering-type particle size distribution measurement method is 0.4 to 11 μm.

10. The positive electrode active substance for an all solid-state lithium secondary battery according to claim 1, wherein the mode diameter according to a measurement of a volume-based particle size distribution obtained via measurements by a laser diffraction scattering-type particle size distribution measurement method is 0.4 to 11 µm.

11. The positive electrode active substance for an all solid-state lithium secondary battery according to claim 1, wherein the average primary particle diameter which is calculated from a scanning-type electron microscope (SEM) image obtained by a scanning-type electron microscope (SEM) is 0.3 to 5.0 µm.

12. The positive electrode active substance for an all solid-state lithium secondary battery according claim 1, wherein a Dmin in a result of measuring a volume-based particle size distribution obtained via measurements by a laser diffraction scattering-type particle size distribution measurement method is 0.1 to 2.0 µm.

13. The positive electrode active substance for an all solid-state lithium secondary battery according to claim 1, wherein, in an X-ray diffraction pattern measured by a powder X-ray diffractometer (XRD), a value of a strain obtained by Rietveld analysis is 0.00 to 0.35.

14. An all solid-state lithium secondary battery, comprising the positive electrode active substance for an all solid-state lithium secondary battery according to claim 1 as a positive electrode active substance.

15. The positive electrode active substance for an all solid-state lithium secondary battery according to claim 1, wherein the amorphous coating compound has a molar ratio, Li/A, of Li relative to the A element, as obtained by X-ray photoelectron spectroscopy (XPS), of greater than 1.0 and 2.3 or less.

16. A positive electrode active substance for an all solid-state lithium secondary battery, having an operating potential of 4.5 V or more at a metal Li reference potential, wherein a surface of present core particles composed of a spinel-type lithium manganese-containing composite oxide containing at least Li, Mn, O, and two or more elements other than Li, Mn, and O is coated with an amorphous compound containing Li, A, and O, where A represents one element or a combination of two or more elements selected from the group consisting of Ti, Zr, Ta, Nb, Zn, W, and Al; a crystallite size of the positive electrode active substance is 80 to 490 nm; and a ratio, crystallite size/average primary particle diameter, of the crystallite size relative to an average primary particle diameter of the positive electrode active substance, which is calculated from a scanning-type electron microscope (SEM) image obtained by a scanning-type electron microscope (SEM), is 0.01 to 0.32;

wherein, with regard to a D50, a mode diameter, and a D10 of the positive electrode active substance, the D50 is 0.5 to 9 µm, a percentage of a ratio of the absolute value of the difference between the mode diameter and the D50 relative to the mode diameter, (|mode diameter−D50|/mode diameter)×100, is 0 to 25%, a percentage of a ratio of the absolute value of the difference between the mode diameter and the D10 relative to the mode diameter, ((|mode diameter−D10|/mode diameter)×100, is 20 to 58%;

wherein a ratio, average primary particle, diameter/D50 of the average primary particle diameter of the positive electrode active substance relative to the D50 is 0.20 to 0.99;

wherein said amorphous compound contains Li in excess of 1 mol relative to 1 mol of the A element; and wherein an amount of carbonate ions present on the surface of the positive electrode active substance is less than 2.5 wt % relative to the positive electrode active substance.

17. The positive electrode active substance for an all solid-state lithium secondary battery according to claim 16, wherein the molar ratio, Li/A, of Li relative to the A element in the positive electrode active substance surface, as obtained by X-ray photoelectron spectroscopy (XPS), is 0.5 to 3.5.

18. The positive electrode active substance for an all solid-state lithium secondary battery according claim 16, wherein the spinel-type lithium manganese-containing composite oxide is represented by a general formula [$Li_x(M1_yM2_zMn_{2-x-y-z})O_{4-\delta}$], wherein $1.00 \leq x \leq 1.20$, $0.20 \leq y \leq 1.20$, $0 < z \leq 0.5$, $0 \leq \delta \leq 0.2$, M1 represents one element or a combination of two or more elements selected from the group consisting of Ni, Co, and Fe, and M2 represents one element or a combination of two or more elements selected from the group consisting of Na, Mg, Al, P, K, Ca, Ti, V, Cr, Cu, Ga, Y, Zr, Nb, Mo, In, Ta, W, Re, and Ce.

19. The positive electrode active substance for an all solid-state lithium secondary battery according claim 16, wherein the spinel-type lithium manganese-containing composite oxide is represented by a general formula [$Li_x(Ni_yM_zMn_{2-x-y-z})O_{4-\delta}$], wherein $1.00 \leq x \leq 1.20$, $0.20 \leq y \leq 0.70$, $0 < z \leq 0.5$, $0 \leq \delta \leq 0.2$, and M represents one element or a combination of two or more elements selected from the group consisting of Na, Mg, Al, P, K, Ca, Ti, V, Cr, Fe, Co, Cu, Ga, Y, Zr, Nb, Mo, In, Ta, W, Re, and Ce.

20. The positive electrode active substance for an all solid-state lithium secondary battery according claim 16, wherein the mode diameter according to a measurement of a volume-based particle size distribution obtained via measurements by a laser diffraction scattering-type particle size distribution measurement method is 0.4 to 11 µm.

* * * * *

UNITED STATES PATENT AND TRADEMARK OFFICE
CERTIFICATE OF CORRECTION

PATENT NO. : 12,347,856 B2
APPLICATION NO. : 16/642614
DATED : July 1, 2025
INVENTOR(S) : Tetsuya Mitsumoto et al.

Page 1 of 1

It is certified that error appears in the above-identified patent and that said Letters Patent is hereby corrected as shown below:

In the Claims

Column 36, Line 9, Claim 3, delete "$1.00{\leq}{\leq}x{\leq}1.20$," and insert -- $1.00{\leq}x{\leq}1.20$, --

Signed and Sealed this
Sixteenth Day of September, 2025

Coke Morgan Stewart
*Acting Director of the United States Patent and Trademark Office*